(12) United States Patent
Hu

(10) Patent No.: US 8,698,340 B2
(45) Date of Patent: Apr. 15, 2014

(54) WIND POWER SYSTEM

(75) Inventor: Guoxiang Hu, Nanjing (CN)

(73) Assignee: Nanjing Yuneng Instrument Co., Ltd., Jiangsu (CN)

( * ) Notice: Subject to any disclaimer, the term of this patent is extended or adjusted under 35 U.S.C. 154(b) by 525 days.

(21) Appl. No.: 12/920,687

(22) PCT Filed: Mar. 4, 2009

(86) PCT No.: PCT/CN2009/000229
§ 371 (c)(1),
(2), (4) Date: Sep. 6, 2010

(87) PCT Pub. No.: WO2009/109107
PCT Pub. Date: Sep. 11, 2009

(65) Prior Publication Data
US 2011/0006543 A1 Jan. 13, 2011

(30) Foreign Application Priority Data

Mar. 4, 2008 (CN) .......................... 2008 1 0020389
Jan. 22, 2009 (CN) .......................... 2009 1 0028373

(51) Int. Cl.
*F03D 3/06* (2006.01)
(52) U.S. Cl.
USPC ............................................ 290/55; 415/4.2
(58) Field of Classification Search
CPC ...................................................... H20K 7/12
USPC ............... 415/4.2, 4.4, 907, 909; 290/44, 55; 416/40, 41, 117, 118, 119; 310/90.5; 384/446; 403/315, 316, 319, 355
See application file for complete search history.

(56) References Cited

U.S. PATENT DOCUMENTS 5,463,257 A 10/1995 Yea
6,984,899 B1 * 1/2006 Rice ................................. 290/44
(Continued)

FOREIGN PATENT DOCUMENTS

CN 201162626 12/2008
DE 20 2004 017 309 U1 2/2005
(Continued)

OTHER PUBLICATIONS

Translation of DE 202004017309 provided by Espacenet.*
(Continued)

*Primary Examiner* — Nathaniel Wiehe
*Assistant Examiner* — Justin Seabe
(74) *Attorney, Agent, or Firm* — Pillsbury Winthrop Shaw Pittman, LLP

(57) ABSTRACT

A wind power generation system is presented that includes a number of wind power generation units on the supporting tower, each wind power generation unit is formed by one vertical axis wind rotor and one or more power generation unit(s). The rotation shaft of the wind rotor is coupled with the rotor shaft of the single generator set through a connector, or the rotation shaft of the wind rotor is connected with the rotor shafts of multiple generator sets through a transmission mechanism. A helical vertical axis wind rotor and a lineal vertical axis wind rotor constructed by a drag type blade and a lift type blade is incorporated having a disassembling and splicing design. With this configuration, the number of the generator sets connected to the single wind rotor in the power generation unit may be adjusted in real time in accordance to different conditions.

11 Claims, 34 Drawing Sheets

(56) References Cited

U.S. PATENT DOCUMENTS

| | | | |
|---|---|---|---|
| 7,362,004 B2 * | 4/2008 | Becker | 290/55 |
| 2007/0018464 A1 | 1/2007 | Becker | |
| 2008/0095631 A1 * | 4/2008 | Bertony | 416/197 A |

FOREIGN PATENT DOCUMENTS

| | | |
|---|---|---|
| DE | 20 2004 017 309 U1 | 3/2005 |
| DE | 20 2007 008 125 U1 | 8/2007 |
| FR | 2 768 187 | 3/1999 |
| GB | 2 386 161 | 9/2003 |
| GB | 2 425 153 | 10/2006 |
| GB | 2 425 153 A | 10/2006 |
| JP | 2003-247483 | 9/2003 |
| WO | WO 2005/108783 | 11/2005 |
| WO | WO 2005/108783 A1 | 11/2005 |
| WO | WO 2007/129049 A1 | 11/2007 |

OTHER PUBLICATIONS

International Search Report dated Jun. 11, 2009.
Extended European Search Report issued on Jul. 22, 2013 in corresponding European Patent Application No. 09717143.3.

* cited by examiner

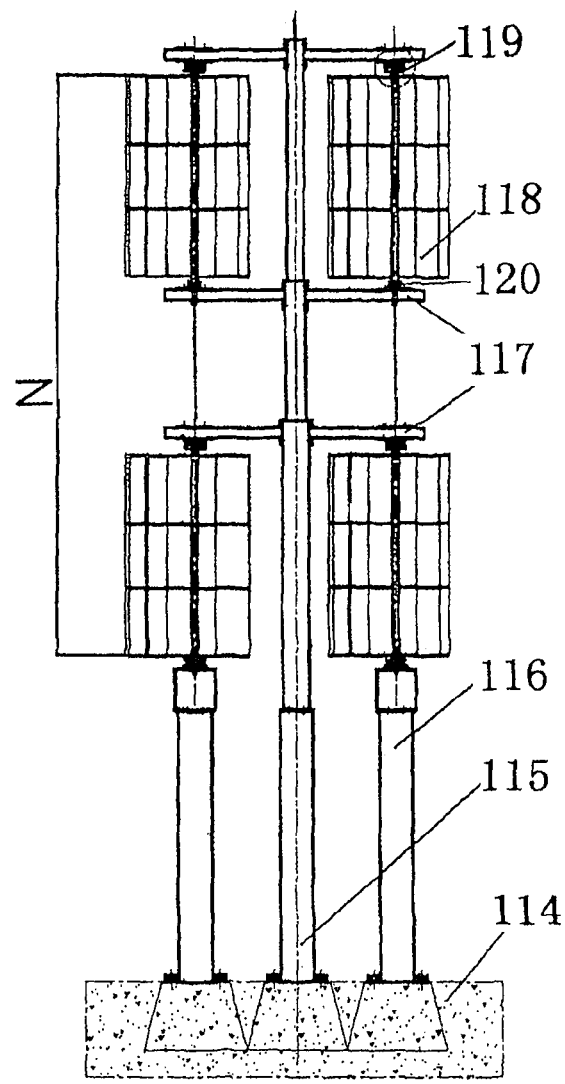
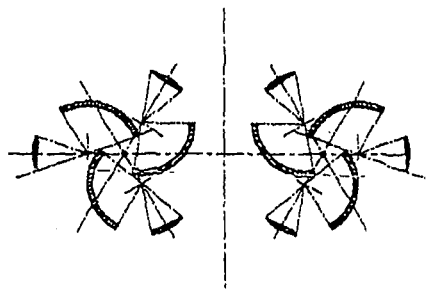
Fig. 4

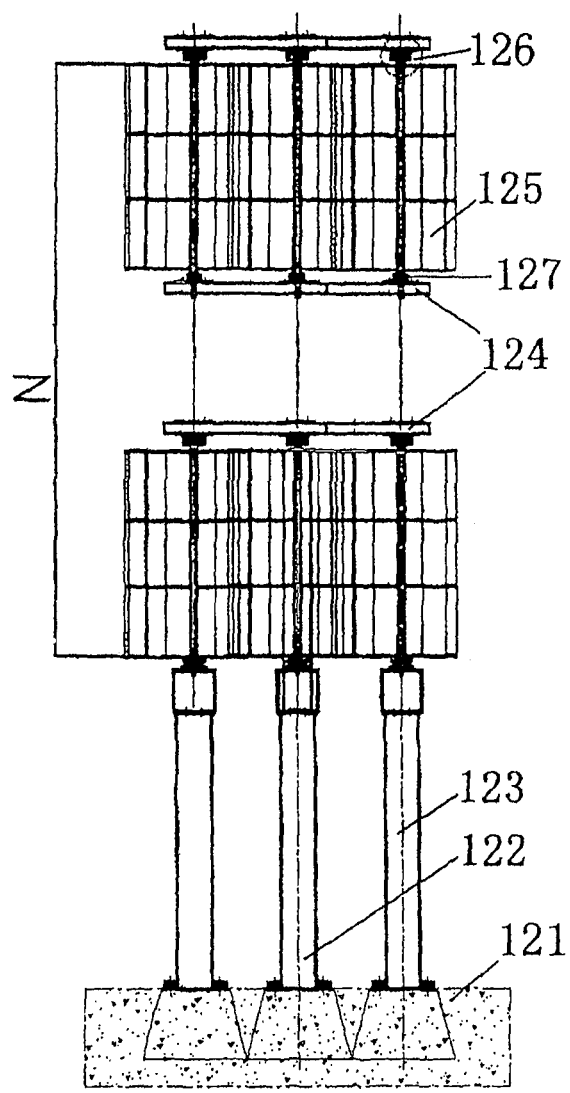
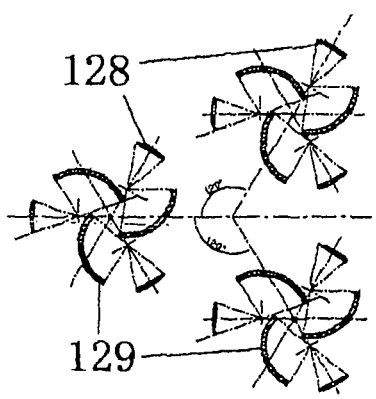
Fig. 5

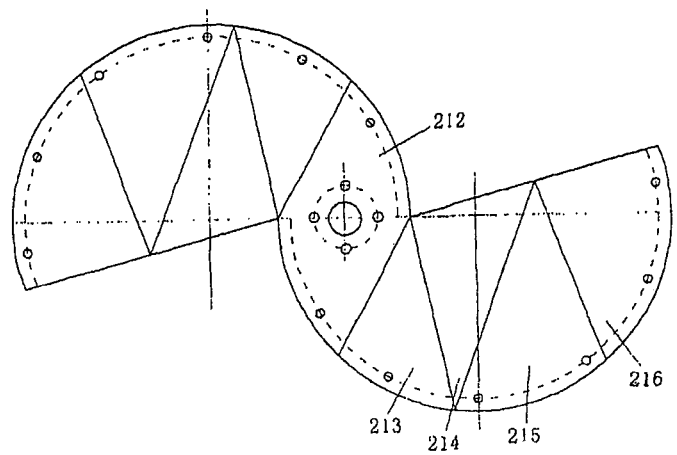
Fig. 9
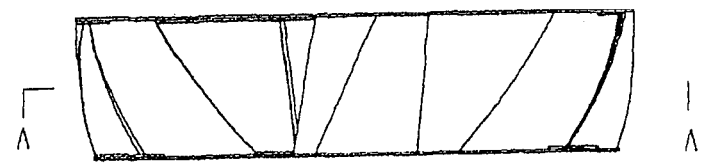
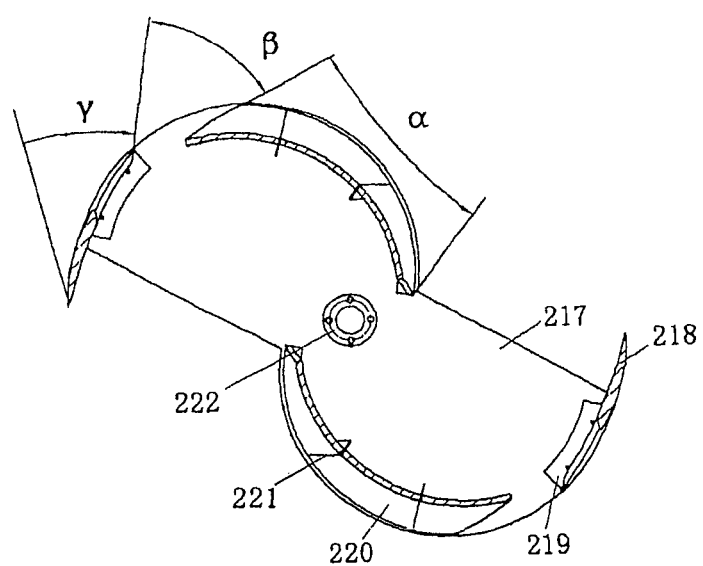
Fig. 10

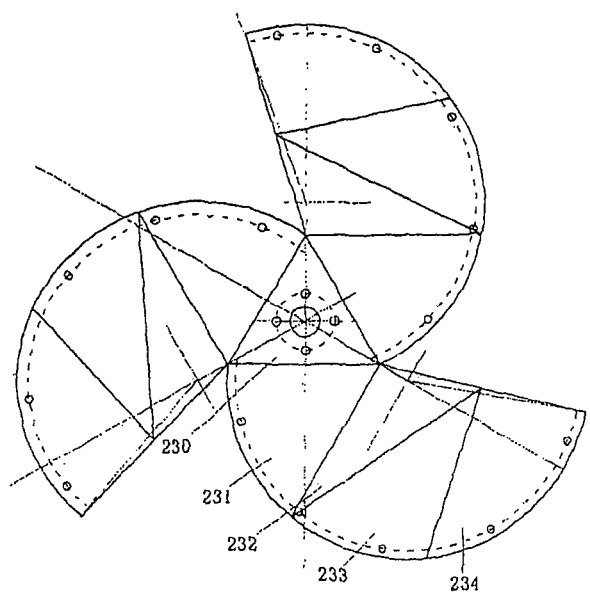
Fig.14
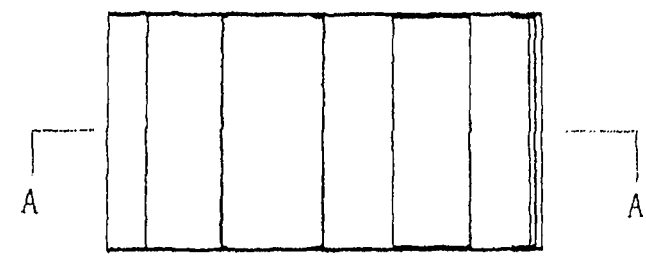
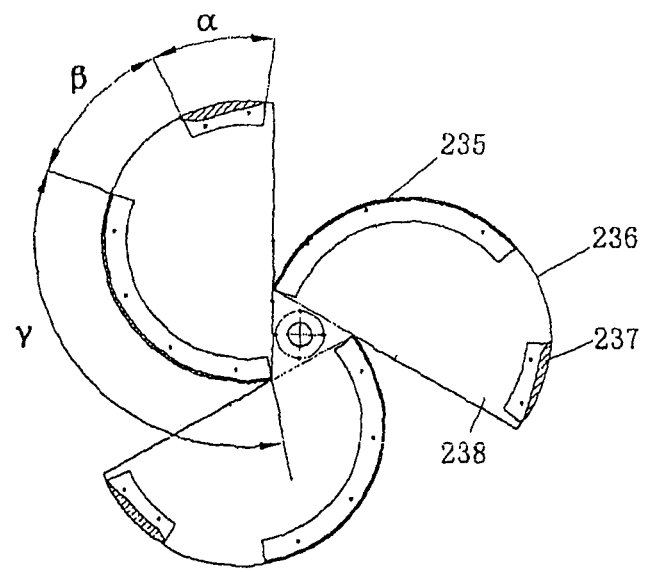
Fig.15

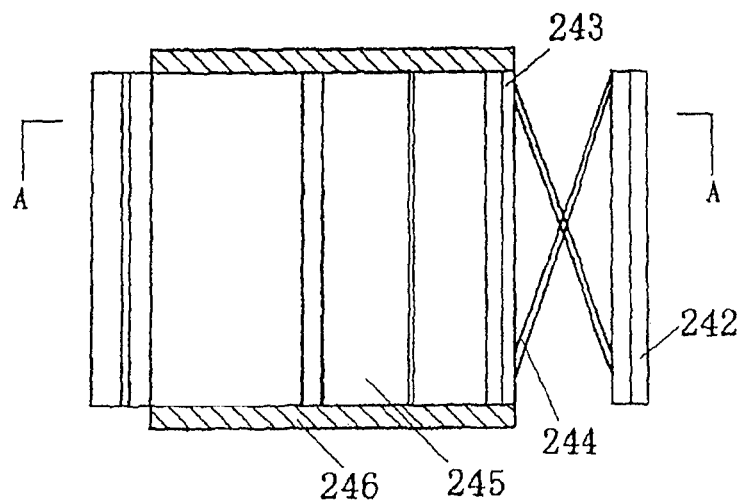
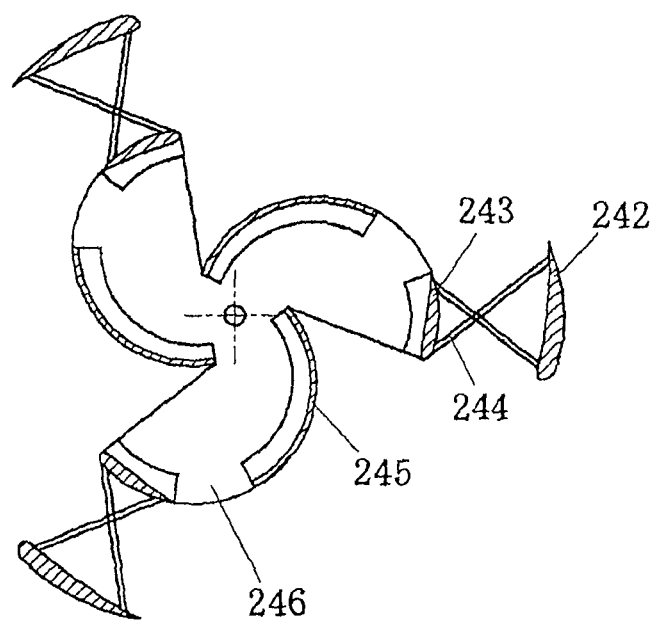
Fig.17

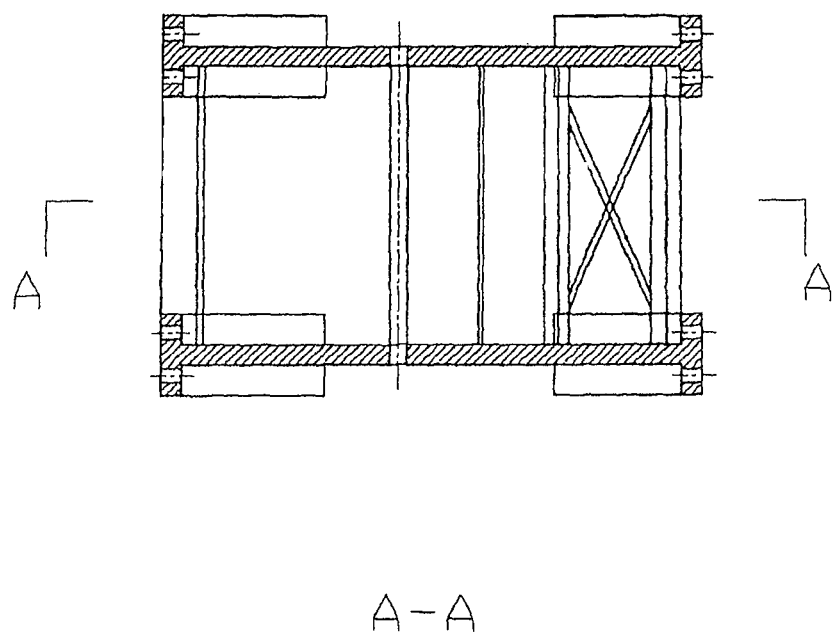
A-A
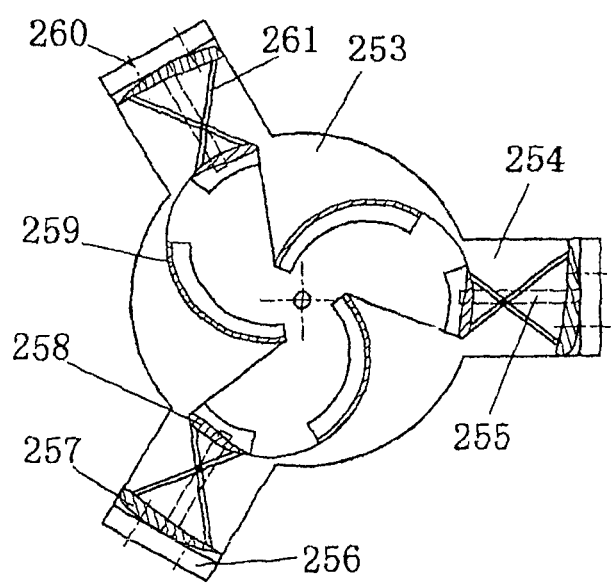
Fig.19

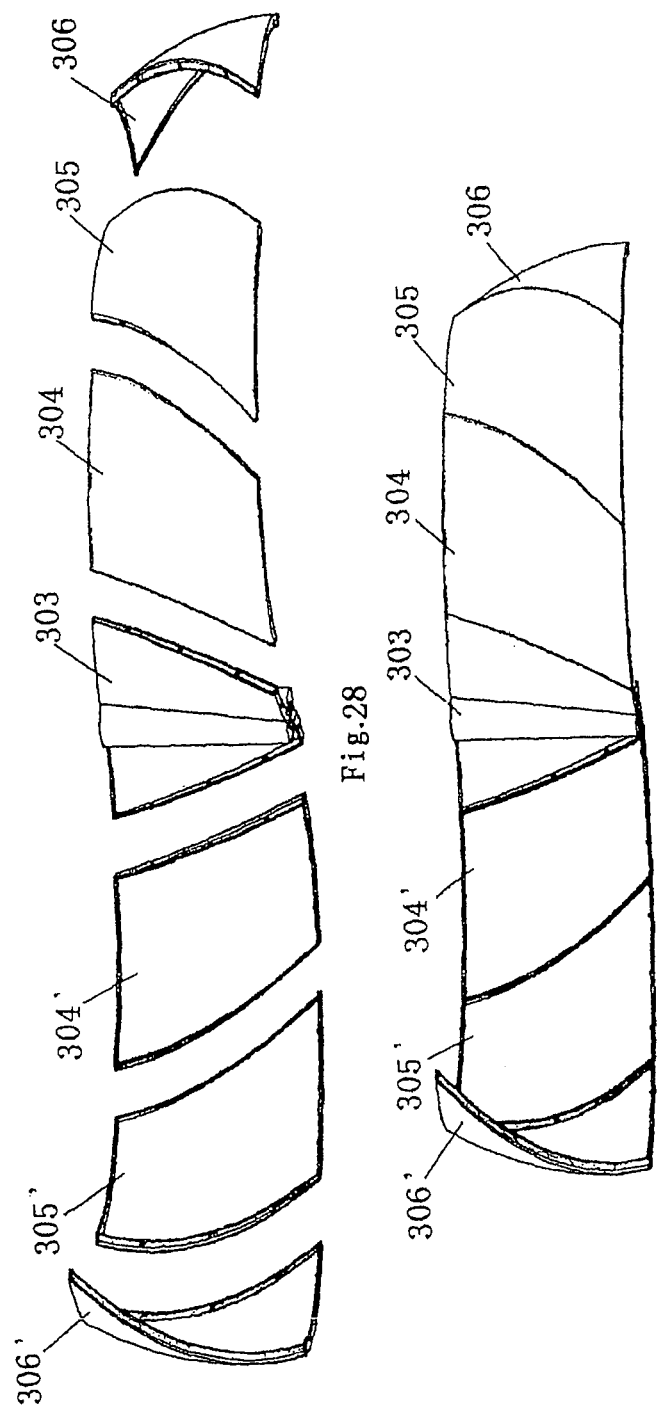

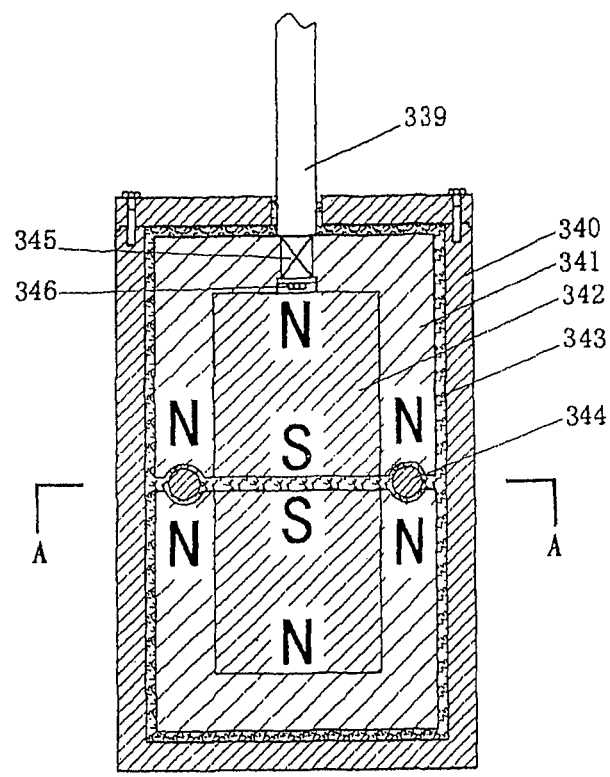
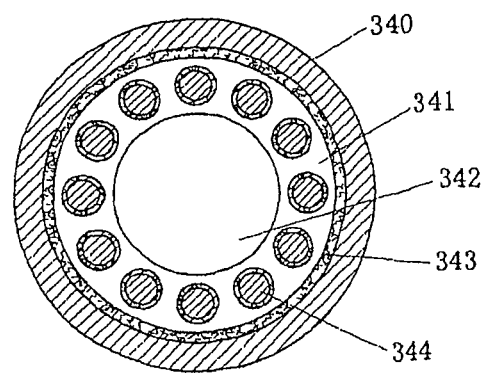
Fig.40

WIND POWER SYSTEM

CROSS-REFERENCE TO RELATED APPLICATIONS

This application is National Stage of PCT/CN2009/000229 filed Mar. 4, 2009, which claims priority to Chinese application No. 200810020389.0 filed Mar. 4, 2008 and Chinese application No. 200910028373.9 filed Jan. 22, 2009, the entire contents of each which are incorporated herein by reference.

TECHNICAL FIELD

The present invention relates to a wind power generation equipment, especially a super large scale wind power generation equipment.

BACKGROUND TECHNIQUES

If the large scale wind power generation equipment, in particular the megawatt-class wind power generation equipment, adopts the conventional horizontal axis type paddle blades, one single blade will have a length up to fifty to seventy meters. The production, transportation and installation of the paddle blade and the generator set as well as the tower erection or the like will meet problems. In the recent years, it is well accepted in the wind power industry that the large scale or the super large scale wind power generation equipment utilizes the vertical axis wind power wind rotor which has entered experimental phase. The existed vertical axis blade is distinguished to pure drag type and pure lift type in shape. The pure drag type blade needs a relative small starting wind speed, but this type of blade presents relatively low wind energy conversion efficiency. On the contrary, the pure lift type blade though presents relatively high wind energy conversion efficiency, the wind speed required to start it is relatively high. For the large scale or the super large scale vertical axial wind power generating equipment, both small starting wind speed and high wind energy conversion efficiency are equivalent goals pursued by the design since the dimension of the blade is super large, at the same time how to reduces difficulties in production, transportation and installation of the super-size blade is also one of the problems must be confronted. Besides, the volume, weight, and production cost as well as installation and transportation of the generator set in the large megawatt-class wind power generating equipment all confront many problems. Even a blade used in megawatt-class wind power equipment can be manufactured finally though it is huge, the weight of the blade is unbearably heavy which causes a higher starting wind speed requirement. Consequently, how to actuate large scale wind power generation equipment under a relatively low wind speed condition is also one of the problems that such wind power generation equipment must confront and solve.

SUMMARY OF INVENTION

One of objectives of the present invention is to provide a wind power generation system with vertical axis wind rotor, whose output power can be superposed and adjusted readily such that the output power of the system exceeds megawatt easily. Another objective of the present invention is to make it possible that the costs spent in production, transportation, installation and maintenance of the system are far below that of the conventional megawatt-class wind power generation system.

In order to achieve the above objectives, the present invention needs to solve one or more of the following main technical problems: first, how to combine a vertical axis wind rotor with one or several small size generator set(s) to construct an individual power generation system or power generation unit; second, how to efficiently array a plurality of power generation units in the space by a supporting tower so that the whole power generation system accomplishes megawatt-level power output; third, how to separately design a large scale vertical axis wind rotor from its axial and radial direction such that the large scale wind rotor is divided into several standard members to be machined and manufactured, thereby reducing the difficulties in production, transportation and installation of the large scale wind rotor.

In order to achieve the above objectives, the present invention follows a novel idea that "breaking up the whole into parts" and "assembling the parts into a whole" as the basic conception of the technical solution. That is to say, in the process of production and transportation of the wind rotor and generator set, each parts and components of the wind power system is miniaturized and modularized, i.e. "breaking up the whole into parts". When all the parts reach a wind field, following the thought of "assembling the parts into a whole", a wind power generation system suitable for the local wind field is built according to the design requests. By using the design of one huge wind rotor driving multiple generator sets and by arranging in the space an array of power generation units which are relatively easier to be manufactured, the total power output of the power generation units achieves megawatt scale, however building a wind power system beyond megawatts scale is still difficult at present. Meanwhile, the aggregate and adjustable power generation model of multiple power generation units can also lower the wind speed condition required to start the megawatt-class wind power generation system.

In order to achieve the above objectives, the present invention adopts the following technical solution: said system construction comprises a vertical axis wind rotor, a transmission mechanism, generator set and a supporting tower, in which the vertical axis wind rotor is mounted on the supporting tower and the vertical axis wind rotor is connected with multiple generator sets via the transmission mechanism to constitute an independent power generation system or power generation unit.

Preferably in the above technical solution, several wind power generation units can be disposed on a single supporting tower, wherein each wind power generation unit may be composed of one vertical axis wind rotor and one or more generator set(s), the rotation shaft of the wind rotor can be coupled to the rotor shaft of a single generator set for example by a connector, or the rotation shaft of the wind rotor can be connected to the rotor shafts of multiple generator sets for example by a transmission mechanism.

Preferably, in the above technical solution, the supporting tower is composed of a tower, a mast and a beam, wherein the tower and the mast are fixed into the ground by a base, and several beams are mounted fixedly to the tower in a way of being spaced apart along the axial direction of the tower while the power generation unit composed of the wind rotor and the generator set is mounted between the upper and lower beams, and the wind rotor is coaxial with the mast.

Preferably in the above technical solution, said multiple wind power generation units are aligned from top to bottom along the axial direction of the mast while each of the power generation units is secured by the upper and lower beams, and the aligned power generation units from top to bottom may be one column positioned on one side of the tower, or may be two columns positioned separately on both sides of the tower, or may be three columns of power generation units positioned around the tower and with one column arranged on the top and two columns arranged on the bottom when viewed from the axial direction of the mast.

Preferably in the above technical solution, said wind power generation units are mounted between the upper and lower beams and the generator set is located above the wind rotor, the upper end of the wind rotor's rotation shaft is coupled with the rotor shaft of one generator set via a coupler, or the upper end of the wind rotor's rotation shaft is connected with the rotor shafts of multiple generator sets via the transmission mechanism while the lower end of rotation shaft of the wind rotor is positioned with the beam by means of bearings.

It is well know that in order to achieving a megawatt scale power output, the wind rotor and the generator set would be a giant object if using single wind rotor and single generator set. One preferable embodiment of the present technical solution is that one wind power generation unit is consisted of one small size vertical axis wind rotor and one generator set, then a wind power generation system is formed by a plurality of such wind power generation units arrayed along the vertical direction or/and horizontal direction on the same supporting tower, as a result the total power output of the system exceeds megawatts scale. Another preferred embodiment of the present technical solution is that one wind power, generation unit is consisted of one medium size vertical axis wind rotor and multiple generator sets, then a wind power generation system is formed by a plurality of such wind power generation units arrayed along the vertical direction or/and horizontal direction on the same supporting tower, as a result the total power output of the system exceeds megawatts scale.

Preferably in the above technical solution, with respect to the vertical axis wind rotor, the present invention gives the following technical solution: the construction of said vertical axis wind rotor may include a drag type blade, a lift type blade, a rotation shaft and a partition board, wherein the drag type blade is provided at the center portion adjacent to said rotation shaft of the wind rotor; the lift type blade is provided on the outer edge of said wind rotor; between the drag type blade and the lift type blade is provided an opening; several drag type blades and lift type blades are arranged symmetrically around the rotation shaft; and several partition boards divide the integral wind rotor in the axial direction of rotation shaft into several layers of wind rotor units. Advantageously, the horizontal angle range corresponding to said drag type blade is from 60 degrees to 100 degrees; the horizontal angle range corresponding to the lift type blade is from 20 degrees to 60 degrees; and horizontal angle range corresponding to the opening between the drag type blade and the lift type blade is from 20 degrees to 60 degrees. Said drag type blade and lift type blade for example may be spiral or lineal. Moreover, said drag type blade and lift type blade preferably may be composed of a plurality of members. The drag type blade members are spliced to each other to extend in the horizontal direction and the drag type blade and the lift type blade are fixedly connected with the adjacent upper and lower partition board in the vertical direction, while each layer of partition board is fixedly connected with the rotation shaft. The circumferences of said drag type blade member and lift type blade member can be provided with perforated turn-over edges through which the join between the members and between the members and the partition board is achieved by means of rivets. Advantageously, said partition board can be assembled by several components. The central portion of the partition board can be fixedly connected with the flange through rivets while the flange can be connected with the rotation shaft by mean of a pin key. Said drag type blade and lift type blade may be spiral or lineal shape. The present preferred technical solution is a design that combines a traditional drag type blade with a traditional lift type blade into an integral wind rotor, wherein by lift type blades is obtained higher wind energy conversion efficiency and by drag type blades is obtained lower starting wind speed. Through a primary simulation test, the wind energy conversion efficiency of said wind rotor is far greater than that of a wind rotor with pure drag type blade because that the lift type blade is positioned at the outer edge of the whole wind rotor and as a result the wind can produce a greater rotation moment for the whole wind rotor. In fact, the opening between the drag type blade and the lift type blade is a wind channel. On the one hand, the provision of the wind channel significantly improves the wind energy conversion efficiency of the lift type blade. On the other hand, the wind channel also has the function of stabilizing the rotation of the wind rotor. The design of structure "containing shaft" between the drag type blade and the rotation shaft also provides the airflow towards the drag type blade a passage for the wind to turn back and be used again, which as a result improve the wind energy conversion efficiency of the drag type blade. Furthermore, the multiple-layered partition board of the wind rotor in the present invention also has the effect of separating the airflow blowing towards the wind rotor from the vertical direction such that the airflow towards the wind rotor will blow to the drag type blade and the lift type blade via wind channels at different horizontal levels, and this efficiently avoid the disadvantageous effect to the wind energy conversion efficiency of the wind rotor due to the turbulence in the vertical direction of the airflow. In the above preferred technical solution, the horizontal angle α corresponding to the drag type blade in said wind rotor advantageously may fall into the range of 60 degrees to 100 degrees; while the horizontal angle γ corresponding to the lift type blade in said wind rotor advantageously may fall into the range of 20 degrees to 60 degrees; and the horizontal angle β corresponding to the opening between the drag type blade and the lift type blade in said wind rotor advantageously may fall into the range of 20 degrees to 60 degrees. FIG. 10 and FIG. 15 show the diagrams of the three angles. The so called "horizontal angle" means the flare angle at the center of circle corresponding to the arc at the drag type blade or the lift type blade or the opening. It is known from the primary wind tunnel experiment, when the horizontal angle corresponding to the drag type blade in the wind rotor takes 80 degrees and the horizontal angle corresponding to the lift type blade takes 40 degrees and the horizontal angle corresponding to the opening between the drag and lift type blades also takes 40 degrees, a lineal wind rotor with three groups of blades would have higher wind energy conversion efficiency.

On the basis of the above technical solution that the drag type blade and the lift type blade are combined into a vertical axis wind rotor, the present invention also discloses an improved design, i.e. several lift type blades may also be provided on the outer side of said lift type blades in the radial direction of the rotation shaft of the wind rotor; openings are provided between these lift type blades; the drag type blades and all the lift type blades are all arranged symmetrically around the rotation shaft; and the drag type blades and the innermost-side lift type blades are secured to the partition board while a rigid frame connection is adopted between the lift type blades. In addition, the improved design also gives out another fixing method for the blade, i.e. the center of the used partition board may be a disk, at the circumference of which is provided symmetrically with several radial spokes, and the drag type blades and the innermost-side lift type blade are secured to the central disk of the partition board while the other lift type blades are fixed to the radial spokes. The spokes are provided with reinforced ribs so as to increase the strength of the whole partition board and with fixed back plates; when mounted, the reinforced ribs of the spokes are inserted into the notches of the lift type blades which are cut out at the upper and lower ends of the lift type blades, and the lift type blades are fixedly connected with the fixed back plate by screws or rivets.

In the above technical solution, the present invention further reveals a preferred specific structure of a vertical axis pure drag type helical wind rotor. Said vertical axis wind rotor may be a combined helical wind rotor which is formed by splicing and combining several vertical members of the wind rotor along the axial direction of the helical wind rotor. Said vertical members of the helical wind rotor can in turn be formed by splicing and combining several horizontal members of the wind rotor along the radial direction of the helical wind rotor. Said horizontal member of the helical wind rotor is composed of a central axis member, a middle member and a peripheral member, in which several middle members are positioned symmetrically on both sides of the central axis member and two peripheral members are positioned on the outer side of the middle members. Said central axis member, middle member and peripheral member are provided at their circumferences with turn-over edges bending towards the direction of the concave curved surface of the members, on which turn-over edges are provided through holes at equal intervals, and the turn-over edges of the adjacent members are abutted and riveted together. The circumferences of said central axis member, middle member and peripheral member may have shapes of rectangle, or triangle or hexagon. The central axis member and the middle member, the middle member and the middle member, and the middle member and the peripheral member are jointed and combined with each other along the axial direction and radial direction into a helical wind rotor.

In the above technical solution, the present invention further discloses a preferred structure mode in which the vertical axis helical wind rotor forms a generator unit, wherein said transmission mechanism can be not only connected with the helical wind rotor but also coupled with the rotor shafts of several generator sets. Said helical wind rotor may be provided with connectors at upper and lower ends respectively. Said connectors can be composed of S-shaped pieces and axle pins. The upper and lower axle pins are fixed to the axial center of upper and lower S-shaped pieces respectively while the upper and lower S pieces are fixed to the upper end and lower end of the helical wind rotor respectively. The upper axle pin is rotatably connected with the supporting frame and the lower axle pin may be connected with a magnetic levitation bearing means. Said magnetic levitation bearing means can comprise a permanent magnet, a soft-ferromagnetic sleeve, rolling balls, lubricating material and a housing. The permanent magnet is disposed in the soft-ferromagnetic sleeve with the same poles of the two permanent magnets opposed and several rolling balls are evenly located between the soft-ferromagnetic sleeve, and lubricating material is filled between the soft-ferromagnetic sleeve and the housing as well as between the two magnets and the soft-ferromagnetic sleeve. The magnetic levitation bearing is used such that the helical wind rotor is subjected to an upward lifting force produced by the magnetic levitation bearing. On the one hand, this can reduce the earth gravity experienced by the wind rotor. On the other hand, this can reduce the frictional resistance between the wind rotor and other components and decrease the lowest wind speed required to start the wind rotor. Said transmission mechanism is composed of a ring-shaped gear and a drive gear, in which the ring-shaped gear is fixedly connected with the vertical axis wind rotor, and several drive gears are engaged with the ring-shaped gear in external meshing or internal meshing, furthermore several drive gears are coupled to the rotor shafts of several generator sets. Between the drive gear and the rotor shaft of the generator set may be provided a clutch which may be composed of an excitation stator, a reset spring and a sliding piece, wherein the excitation stator, the reset spring and the sliding piece are in turn nested onto the rotor shaft of the generator. The drive gear is loosely-fitted connected with the rotor shaft of the generator. The sliding piece is slidingly engaged with the generator rotor by a keyway. Under the action of the tension produced by the reset spring, a pin key of the sliding piece may be inserted into a pin hole of the drive gear. The drive gear is synchronously rotated with the generator's rotor shaft. When the excitation stator produces magnetic force, the sliding piece is subjected to the attraction of the magnetic force and can displace by overcoming the tension of the reset spring, such that the pin key of the sliding piece retreats from the pin hole of the drive gear and the rotor shaft of the generator is disengaged from the synchronized connection with the drive gear.

In the above technical solution, the present invention advantageously can also be added a wind meter and dogvane, and an automatic control device which can include a signal processing circuit, a single-chip control circuit and a drive circuit for the clutch of the generator set. Said automatic control device receives and processes signals from the wind meter and dogvane by calculation and decision procedures of the single-chip and then sending an instruction to the drive circuit which drives the corresponding clutch of the generator set to disengage or engage, thereby changing the starting load or service load of the wind power generation system. In this way, when the vertical axis wind rotor starts, the system can automatically regulate to decrease the number of the generator sets coupled with the wind rotor and thereby decrease the starting inertia of the wind rotor according to the actual wind force in current. Once the wind rotor starts, the system may automatically regulate the number of the generator sets coupled with the wind rotor again to an optimal number according to the wind force.

The advantages of the present invention comprise at least one of the following:

1. The present invention adopts several "one-to-one" generator sets (i.e. one small size vertical axis wind rotor and one generator set construct one power generation unit) and several "one-to-many" generator sets (i.e. one medium size vertical axis wind rotor and a plurality of generator sets construct one power generation unit), which form megawatt-class wind power generation system by "assembling the parts into a whole". This technical solution overwhelms the traditional concept that the megawatt-class wind power generation system needs super large wind rotor and super large generator set, thereby greatly lowing the difficulties and costs in production, transportation, installation and maintenance of the megawatt-class wind power generation system.

2. "One-to-one" and "one-to-many" power generation units are like "building blocks". A design may select different "building blocks" to make an optimal combination according to the actual wind resources of the wind field. Since the volume of individual power generation unit is relatively small, its production difficulty is relatively low. Therefore, the power generation unit can be normalized and standardized. In this way, with respect to different wind field conditions, the above optimal combination which reaches the effect of megawatt level power output can be accomplished by adjusting the structure of the supporting tower in the wind field and properly arraying each power generation units. By using a transmission mechanism and a clutch in the "one-to-many" power generation unit, the number of the generator sets connected to the wind rotor can be regulated such that a plurality of generator sets with small power engage and disengage according to the actual requirements. On the one hand, this can reduce the starting load of the wind rotor rotor and decrease the requirement to the starting wind speed. On the other hand, this can load proper number of generator sets with small power by disengaging and engaging at real time according to the varying conditions of the wind speed in the wind field in order to have the greatest power output in variant wind speed conditions. In addition, these "building block" type power generation units have relatively small volume and relatively lighter weight and can resist larger wind disaster, thus being of higher safety.

3. The present invention also discloses several preferred structure designs for the vertical axis wind rotor. The designs adapt to large scale or super large scale wind power wind rotor by utilizing a strategy of "breaking up the whole into parts", in which even medium-to-small size wind rotor has considerably huge dimension. The present invention carries out a design of decomposing and assembling wind rotor in the horizontal direction and vertical direction, thereby lowering the costs and difficulties in production, transportation and installation of large scale or super large scale wind rotor rotor.

4. The vertical axis drag type helical wind rotor revealed by the present invention requires a relatively low starting wind speed. The vertical axis wind rotor that is formed by the combination of drag type blade and lift type blade as disclosed in the present invention satisfactorily displays the advantage of high wind energy conversion efficiency related to the lift type blade under the high wind speed condition and also presents the merit of small starting wind speed related to the drag type blade. The layered structure of the partition board with respect to drag type blade and lift type blade effectively overcomes the negative influence to the wind rotor caused by the turbulence in the vertical direction of the airflow and further improve the utilization of the whole wind rotor to wind energy. The "disengageable or apparent-containing" structure between the drag type blade and rotation shaft also enables the wind force acting on the internal side of the drag type blade to turn back and be recycled. The present invention also proposes a vertical axis wind rotor formed by cooperation of one drag type blade and multiple lift type blades, in which the multiple lift type blades on the external side of the wind rotor effectively raise the wind energy conversion efficiency of the whole wind rotor such that the wind rotor can be used in a wind field condition where the wind speed varies greatly.

5. The present invention can use a magnetic levitation bearing such that the wind rotor experiences an upward lifting force due to the magnetic levitation bearing, which lifting force on the one hand can decrease the earth gravity experienced by the wind rotor and on the other hand can reduce the friction resistance between the wind rotor and the rest components thereby decreasing the lowest requirement of wind speed to start the wind rotor.

DETAILED DESCRIPTION OF DRAWINGS

FIG. 1 presents, in a side view and a top view, a structural diagram of a wind power generation system formed by a column of power generation units in the present invention.

FIG. 4 presents, in a side view and a top view, a structural diagram of a wind power generation system in the present invention formed by two columns of power generation units.

FIG. 5 presents, in a side view and a top view, a structural diagram of a wind power generation system in the present invention formed by three columns of power generation units.

Figure 6:
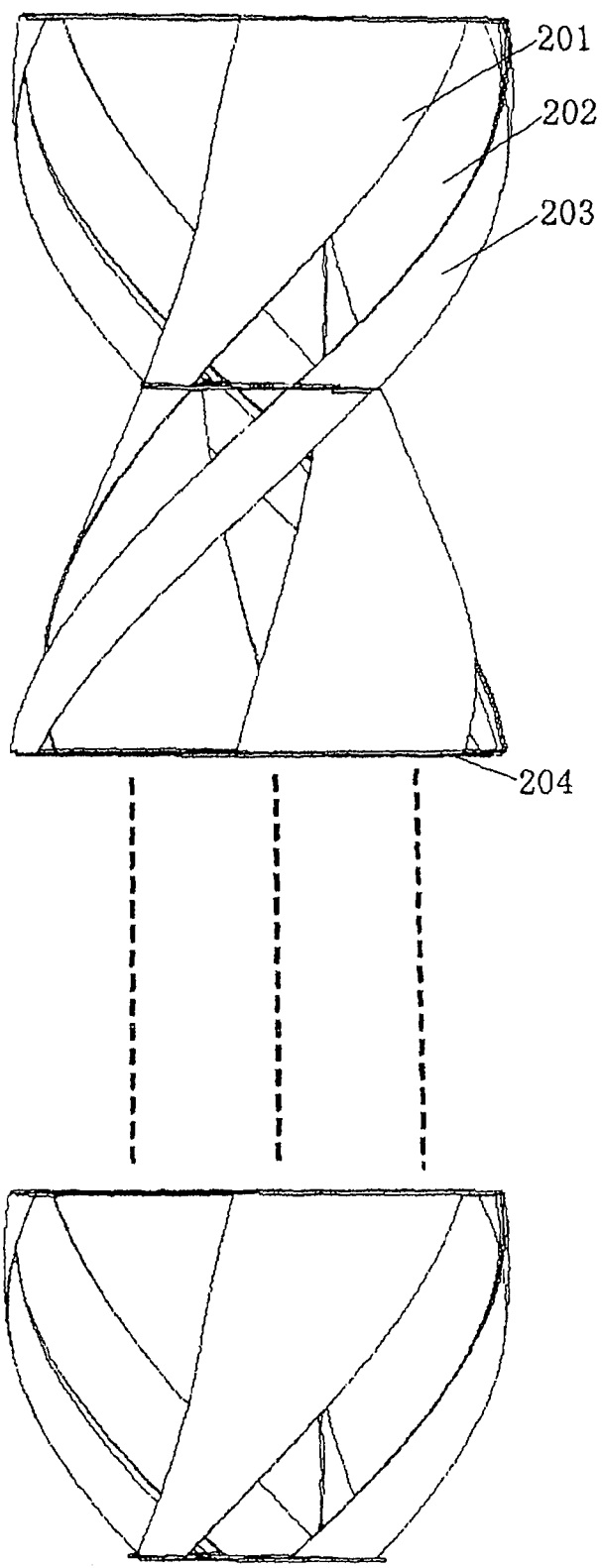

FIG. 6 presents, in a side view, a structural diagram of a wind rotor of the present invention formed by a combination of helical drag type blade and helical lift type blade.

Figure 7:
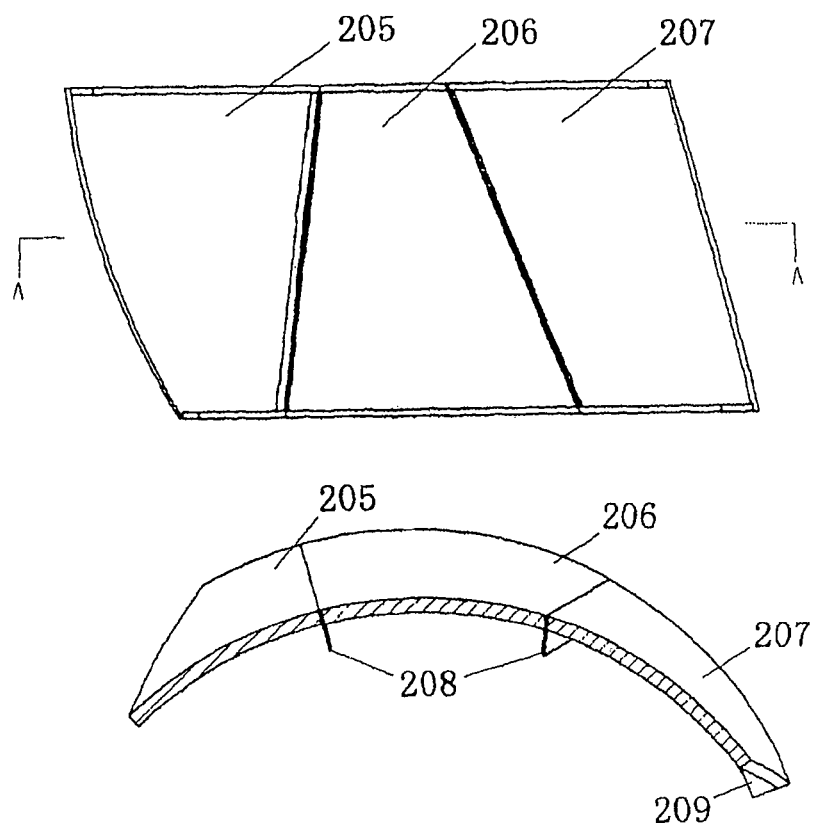

FIG. 7 presents, in a side view and a sectional view through line A-A, a structural diagram of the drag type blade in the wind rotor of the present invention formed by a combination of helical drag type blade and helical lift type blade.

Figure 8:
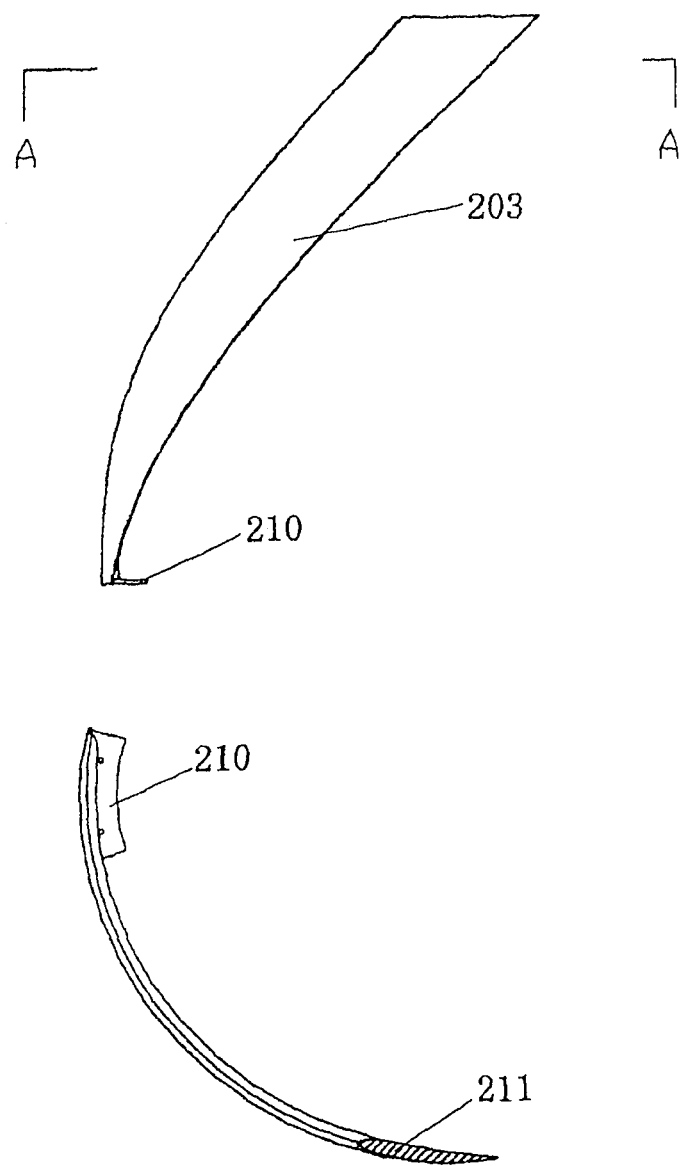

FIG. 8 presents, in a side view and a sectional view through line A-A, a structural diagram of the lift type blade in the wind rotor of the present invention formed by a combination of helical drag type blade and helical lift type blade.

FIG. 9 is a structural diagram of a partition board in the wind rotor of the present invention formed by a combination of helical drag type blade and helical lift type blade.

FIG. 10 presents, in a side view and a sectional view through line A-A, a diagram showing the assembly of the wind rotor of the present invention formed by a combination of helical drag type blade and helical lift type blade.

Figure 11:
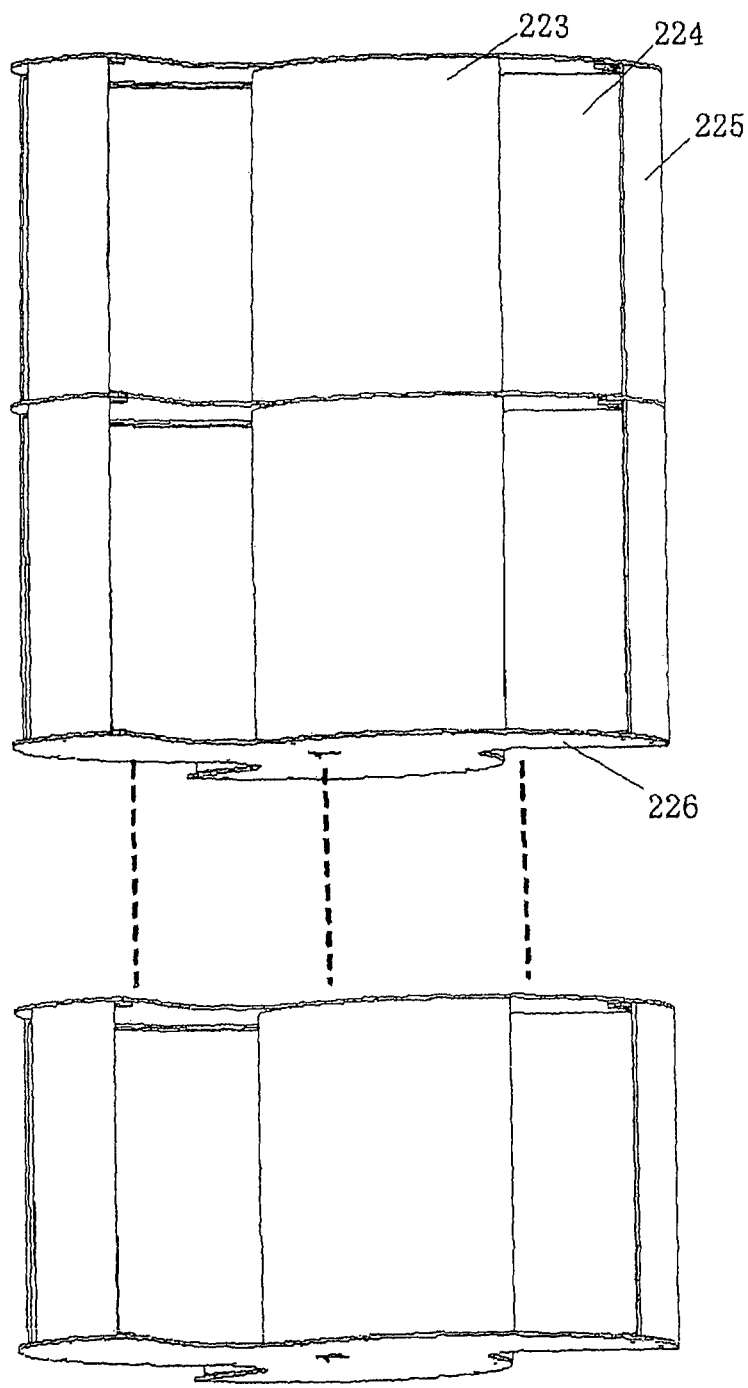

FIG. 11 is a structural diagram of a wind rotor in the present invention formed by a combination of three groups of lineal drag type blades and lineal lift type blades.

Figures 12, 13:
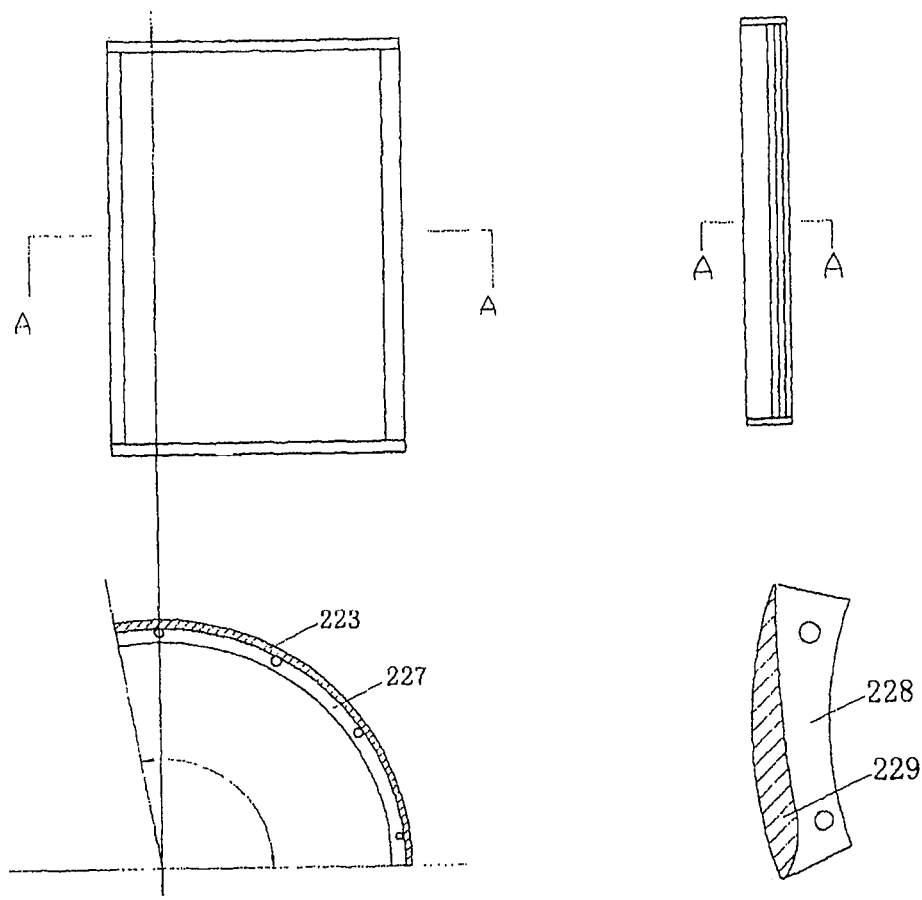

FIG. 12 presents, in a side view and a sectional view through line A-A, a structural diagram of the drag type blade in the wind rotor of the present invention formed by a combination of three groups of lineal drag type blades and lineal lift type blades.

FIG. 13 presents, in a side view and a sectional view through line A-A, a structural diagram of the lift type blade in the wind rotor of the present invention formed by a combination of three groups of lineal drag type blades and lineal lift type blades.

FIG. 14 is a structural diagram of a partition board of the wind rotor in the present invention formed by a combination of three groups of lineal drag type blades and lineal lift type blades.

FIG. 15 presents, in a side view and a sectional view through line A-A, a diagram showing the assembly of the wind rotor in the present invention formed by a combination of three groups of lineal drag type blades and lineal lift type blades.

Figure 16:
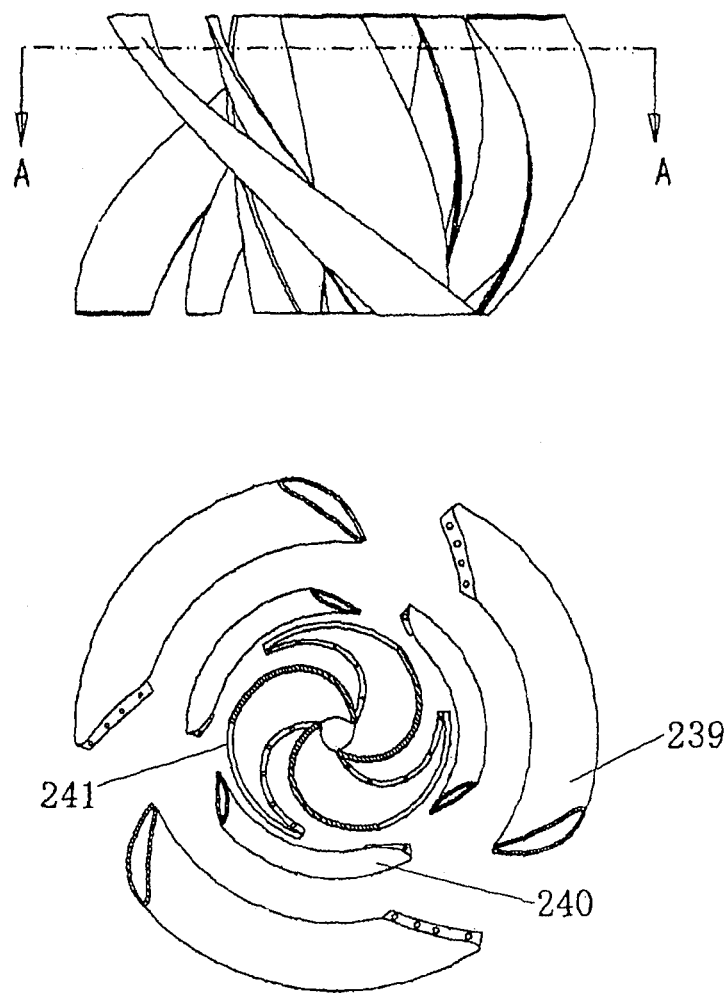

FIG. 16 presents, in a side view and a sectional view through line A-A, a diagram showing the shape and structure of a wind rotor of the present invention formed by a combination of helical drag type blade and helical double lift type blades.

FIG. 17 presents, in a side view and a sectional view through line A-A, a structural diagram of a wind rotor of the present invention formed by a combination of lineal drag type blade and lineal double lift type blades.

Figure 18:
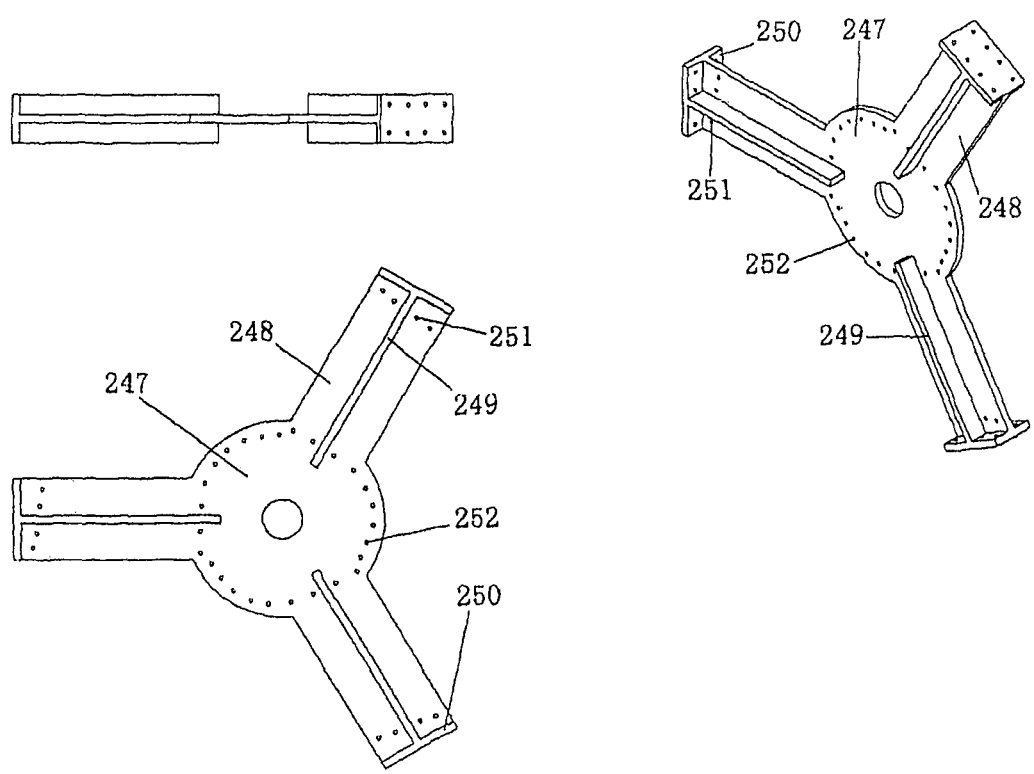

FIG. 18 is a structural diagram of a radial partition board adapted to drag type blade and double lift type blades.

FIG. 19 presents, in a side view and a sectional view through line A-A, a structural diagram of the lineal drag type blade and the lineal double lift type blades as well as the radial partition board.

Figure 20:
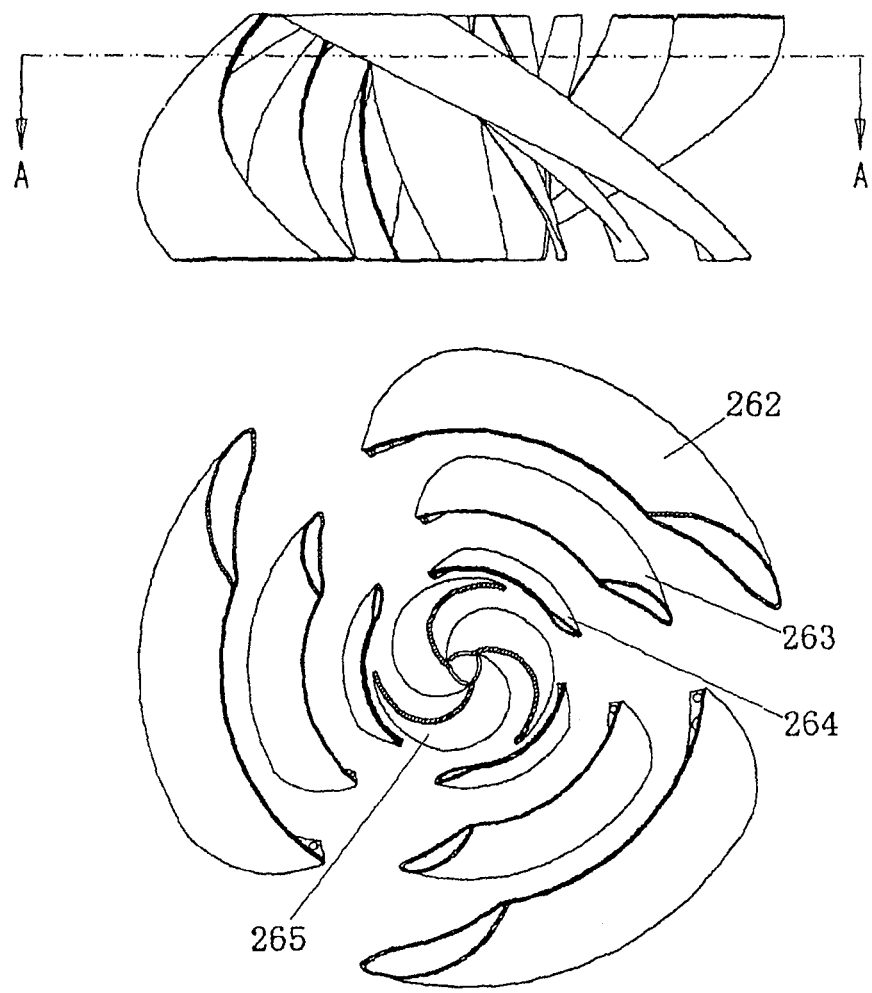

FIG. 20 presents, in a side view and a sectional view through line A-A, a diagram showing the shape and structure of a wind rotor of the present invention formed by a combination of helical drag type blade and helical triple lift type blades.

Figure 21:
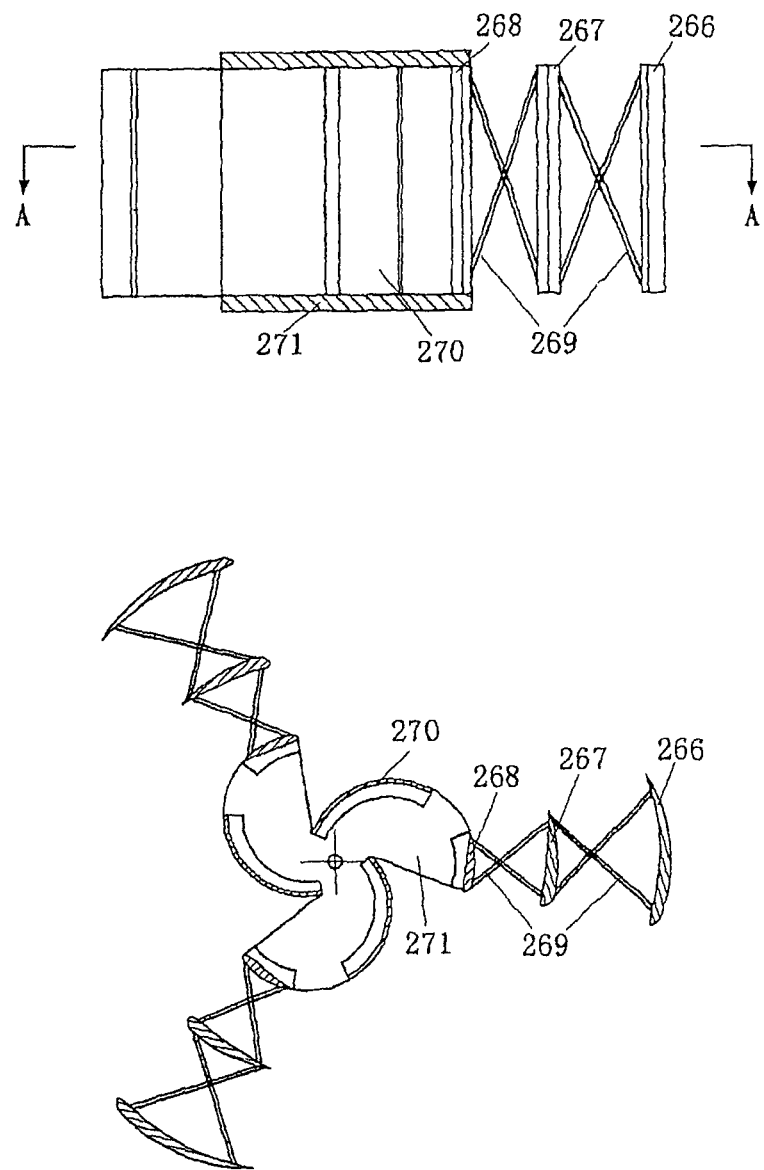

FIG. 21 presents, in a side view and a sectional view through line A-A, a structural diagram of a wind rotor of the present invention formed by a combination of lineal drag type blade and lineal triple lift type blades.

Figure 22:
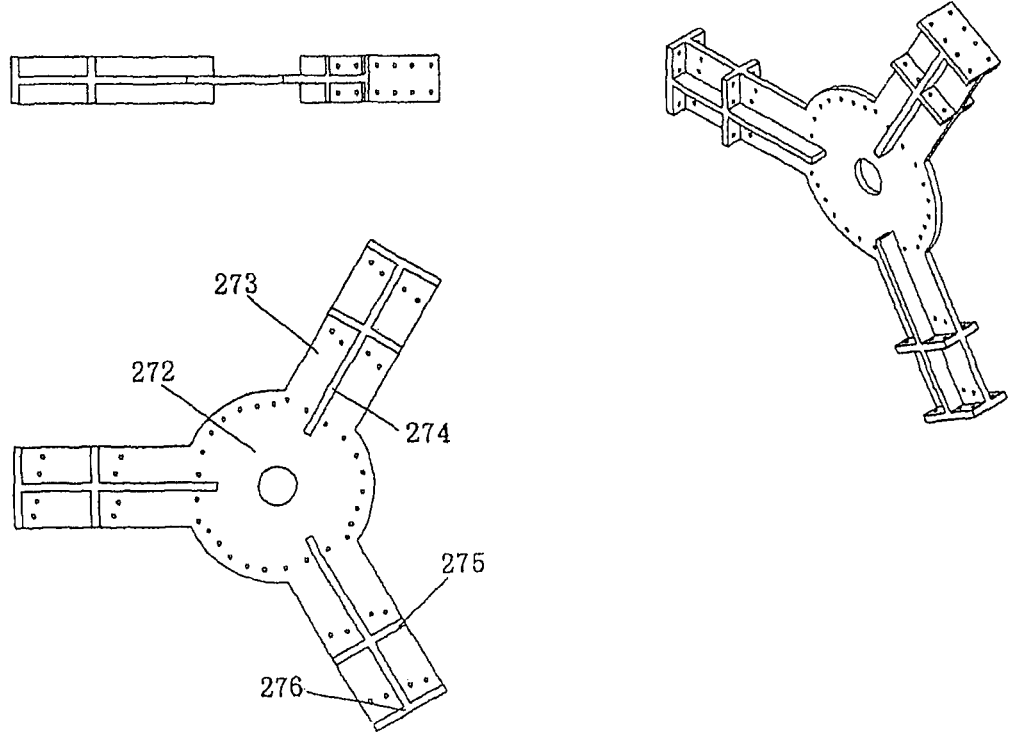

FIG. 22 is a structural diagram of a radial partition board adapted to drag type blade and triple lift type blades.

Figure 23:
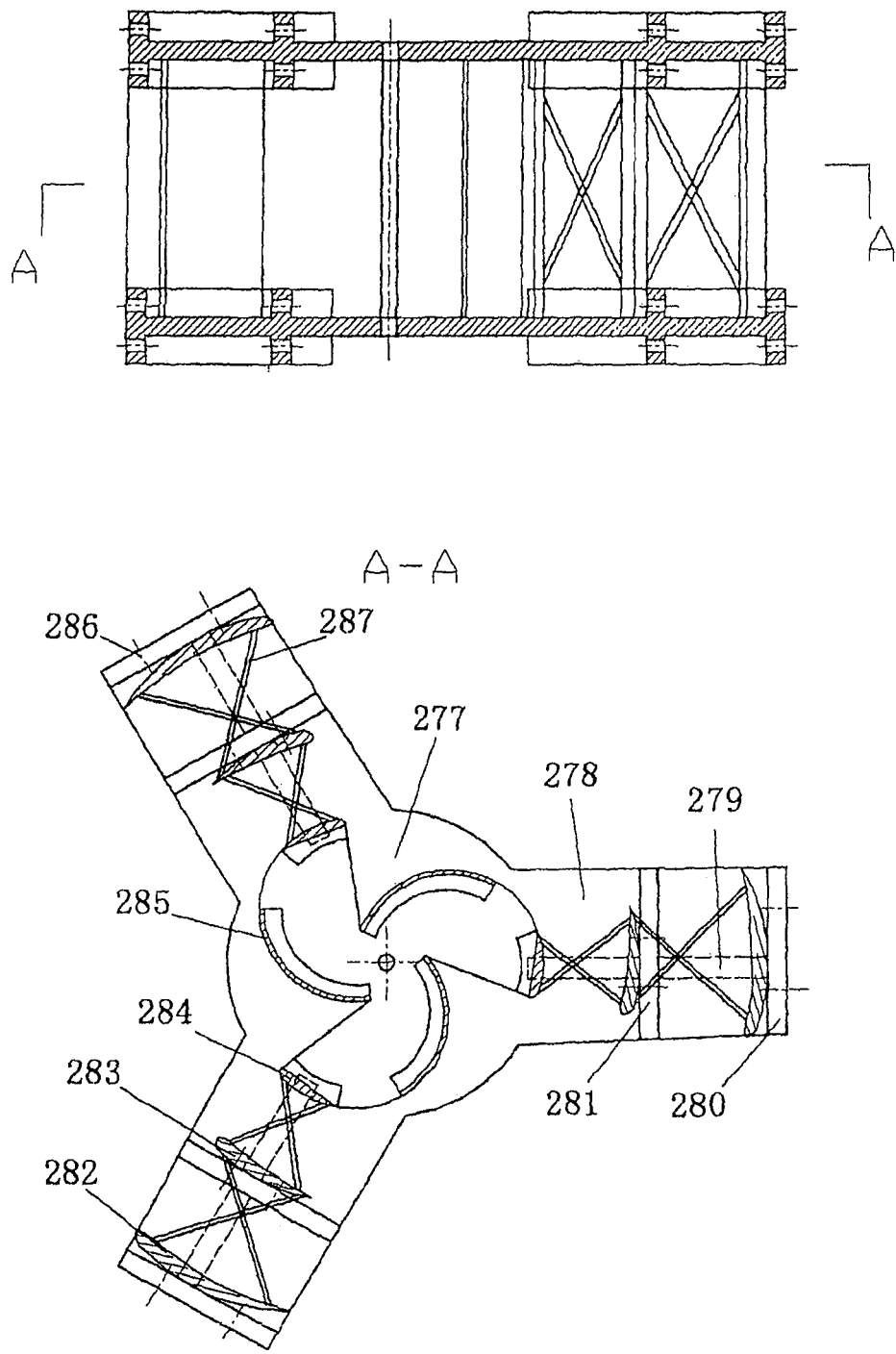

FIG. 23 presents, in a side view and a sectional view through line A-A, a structural diagram of the lineal drag type blade and the lineal triple lift type blades as well as the radial partition board.

Figure 24:
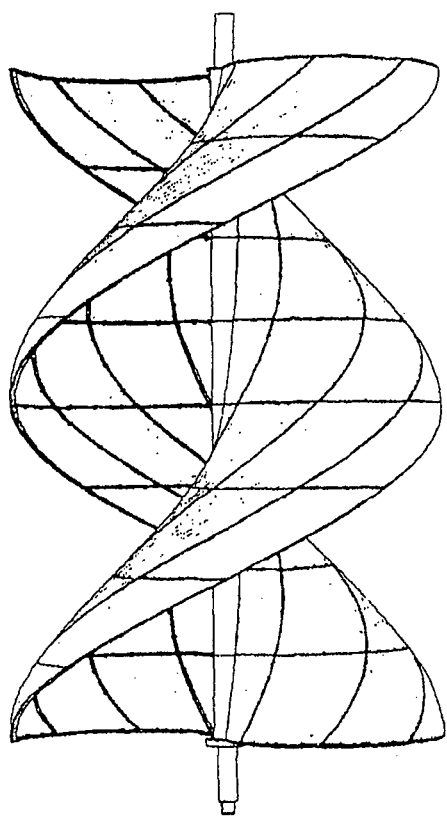

FIG. 24 is a diagram showing the shape of a drag type helical wind rotor in the present invention.

Figure 25:
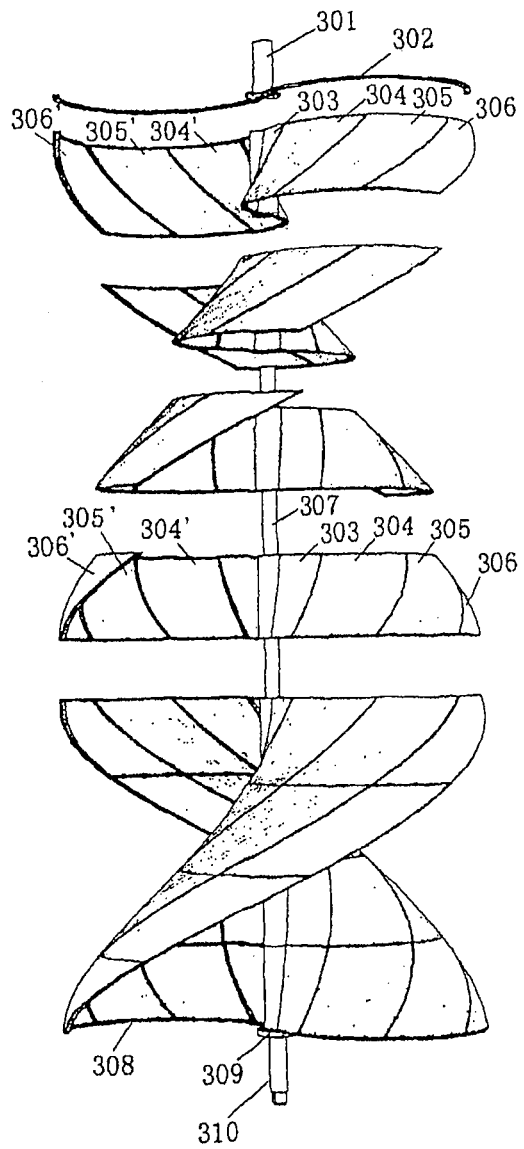

FIG. 25 is a diagram showing the assembly of the drag type helical wind rotor along the axial direction in the present invention.

Figure 26:
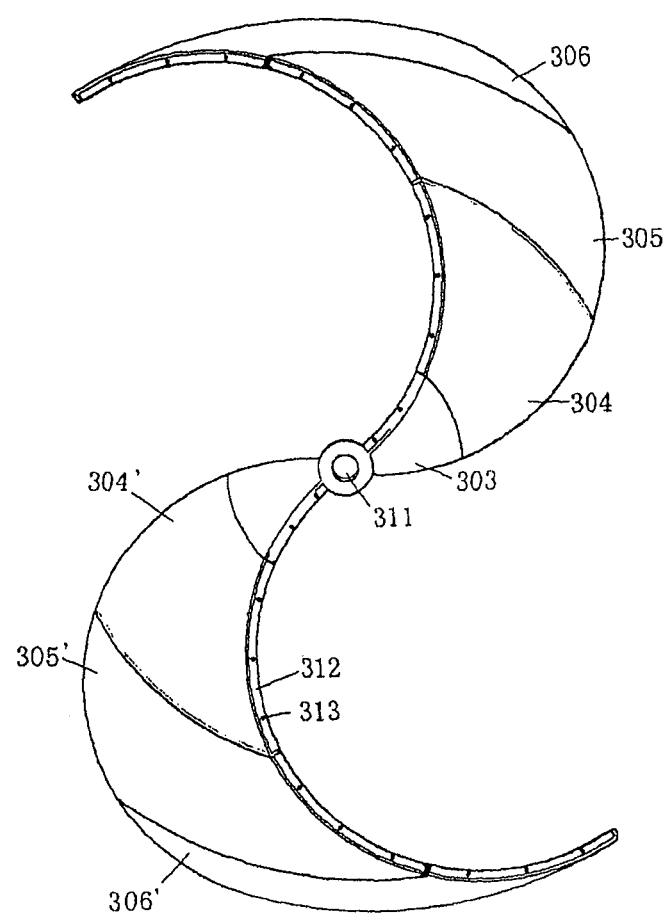

FIG. 26 is an explicit diagram showing the shape of a vertical member of the drag type helical wind rotor in the present invention.

FIG. 27 is a front view diagram of the vertical member of the drag type helical wind rotor in the present invention.

FIG. 28 is a diagram of the vertical member of the drag type helical wind rotor in the present invention, unfolded in the radial direction.

Figure 29:
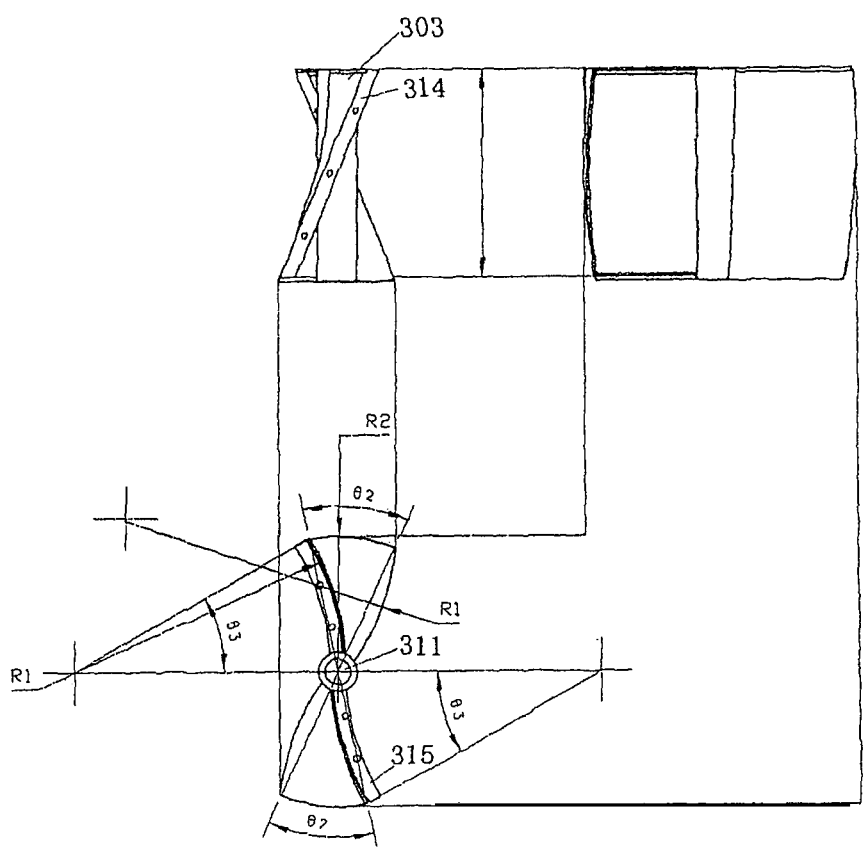

FIG. 29 is a three-view diagram showing the shape and structure of a central axis member of the drag type helical wind rotor in the present invention.

Figure 30:
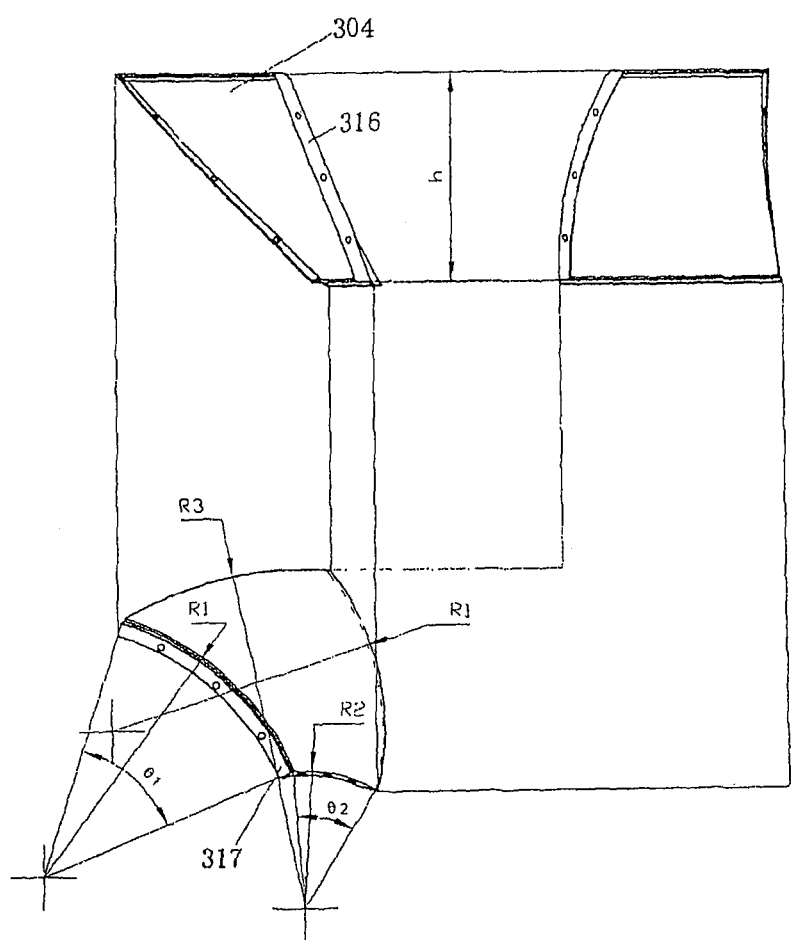

FIG. 30 is a three-view diagram showing the shape and structure of a middle I member of the drag type helical wind rotor in the present invention.

Figure 31:
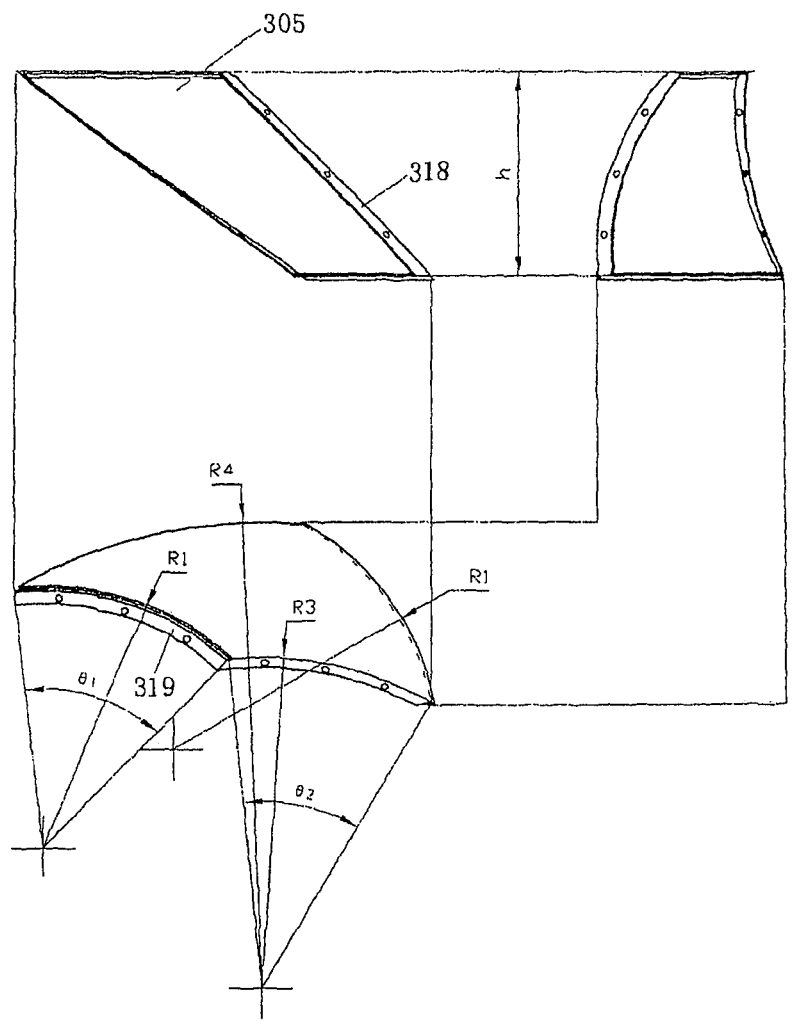

FIG. 31 is a three-view diagram showing the shape and structure of a middle II member of the drag type helical wind rotor in the present invention.

Figure 32:
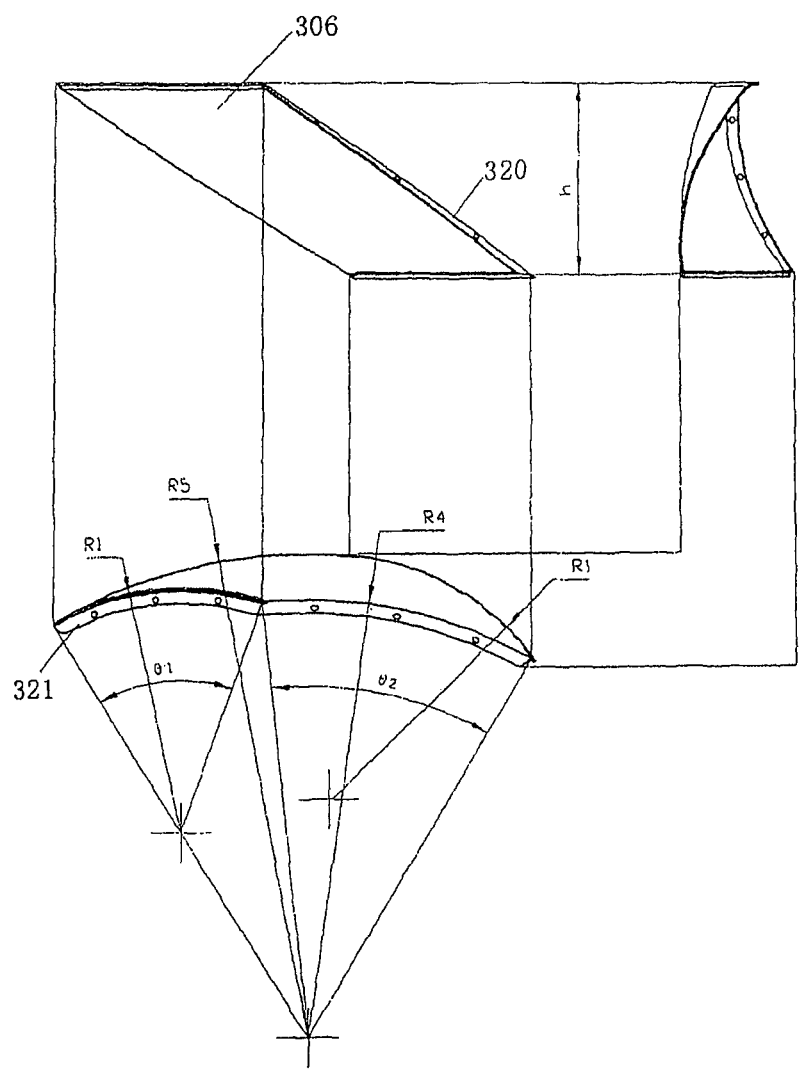

FIG. 32 is a three-view diagram showing the shape and structure of a peripheral member of the drag type helical wind rotor in the present invention.

Figure 33:
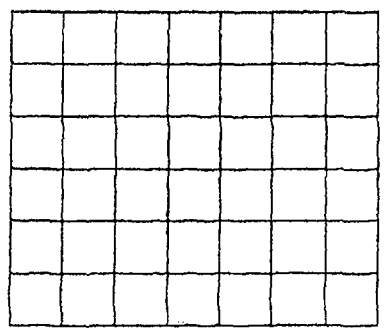

FIG. 33 is an unfolded plan-view diagram of the helical wind rotor formed by combining aligned rectangular central axis members, middle members and peripheral members.

Figure 34:
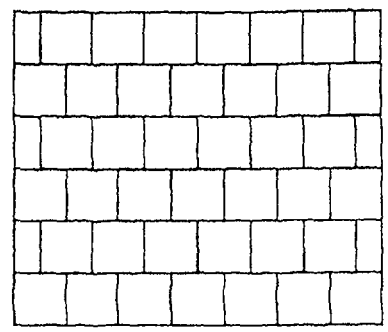

FIG. 34 is an unfolded plan-view diagram of the helical wind rotor formed by combining staggered rectangular central axis members, middle members and peripheral members.

Figure 35:
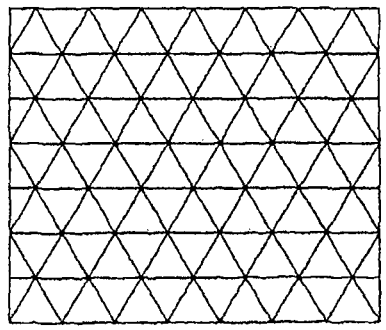

FIG. 35 is an unfolded plan-view diagram of the helical wind rotor formed by combining aligned triangular central axis members, middle members, and peripheral members.

Figure 36:
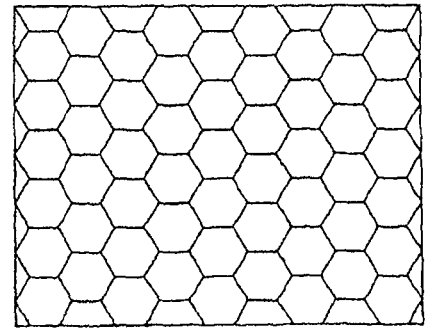

FIG. 36 is an unfolded plan-view diagram of the helical wind rotor formed by combining staggered hexagonal central axis members, middle members and peripheral members.

Figure 37:
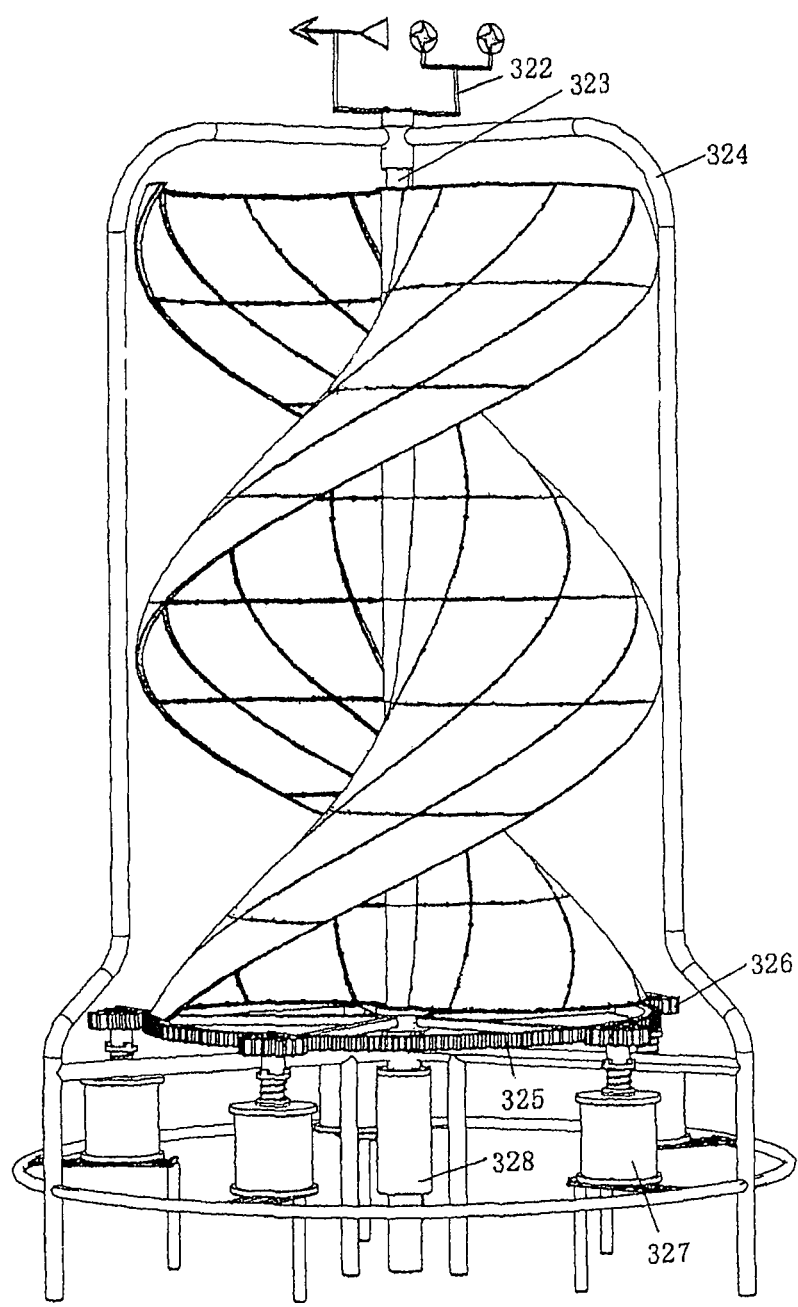

FIG. 37 is a structural diagram of a wind power generation system in the present invention formed by large scale helical wind rotor and multiple generator sets.

Figure 38:
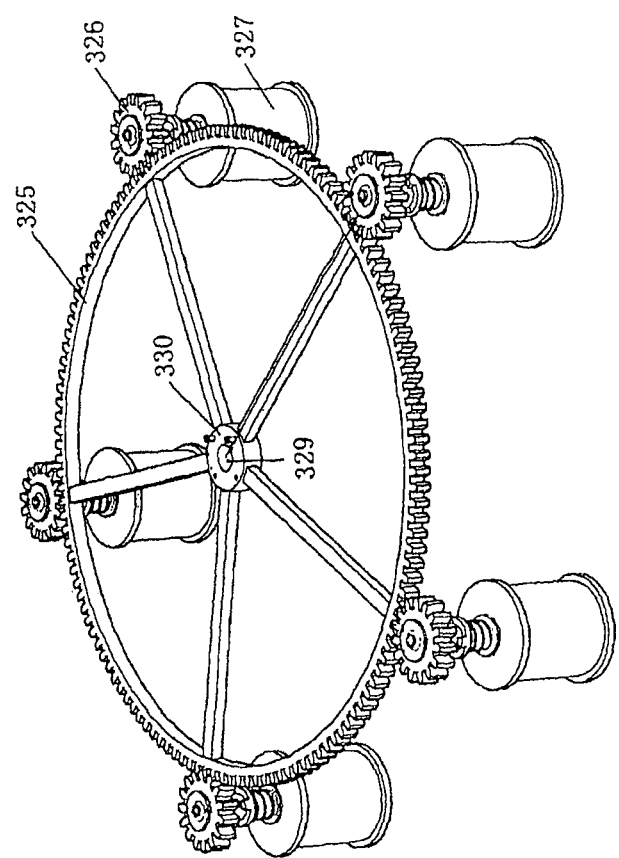

FIG. 38 is a structural diagram of a transmission mechanism and multiple generator sets in the present invention.

Figure 39:
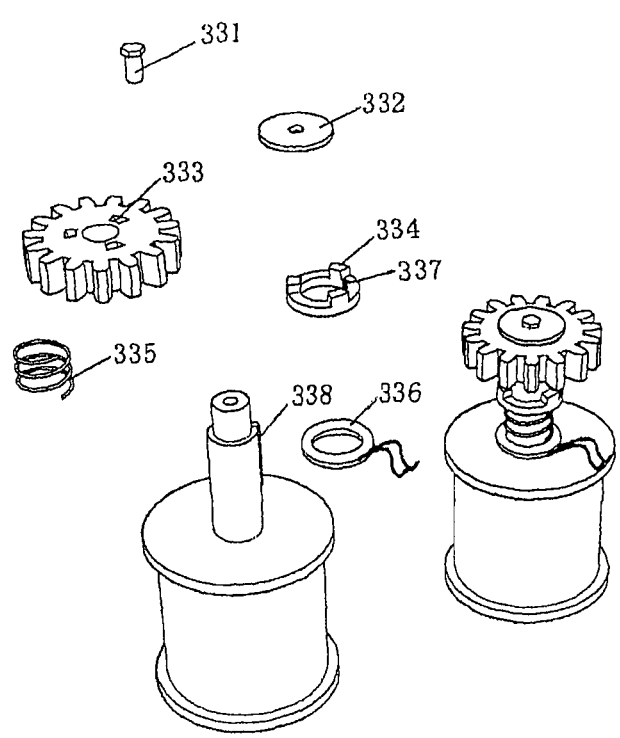

FIG. 39 is a diagram showing the assembly of a transmission mechanism with a clutch and a generator set in the present invention.

FIG. 40 presents, in a side view and a sectional view through line A-A, a structural diagram of a magnetic levitation bearing of the present invention.

Figure 41:
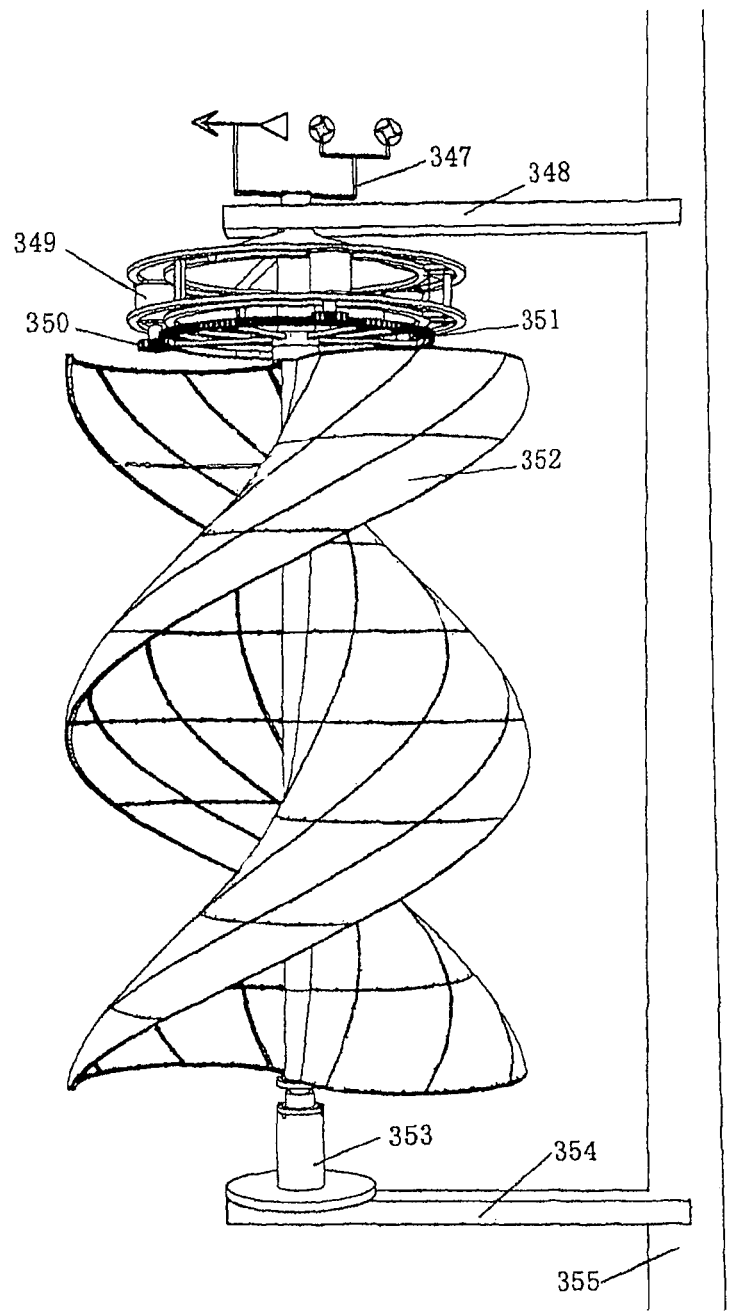

FIG. 41 is a structural diagram of a wind power generation unit with a pure drag type helical wind rotor in the present invention (multiple generator sets are located above the wind rotor and can supply power to street lamps).

Figure 42:
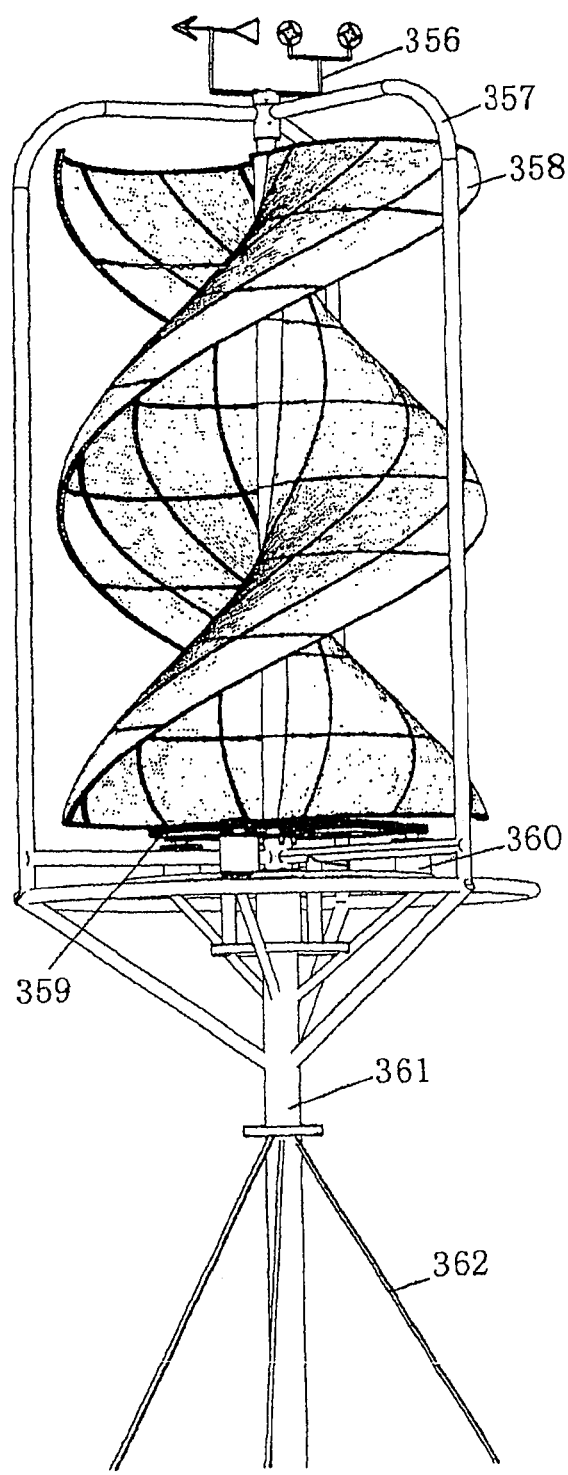

FIG. 42 is a structural diagram of a drag type wind power generation system of the present invention using another kind of supporting frame (multiple generator sets are located on the structure under the wind rotor).

Figure 43:
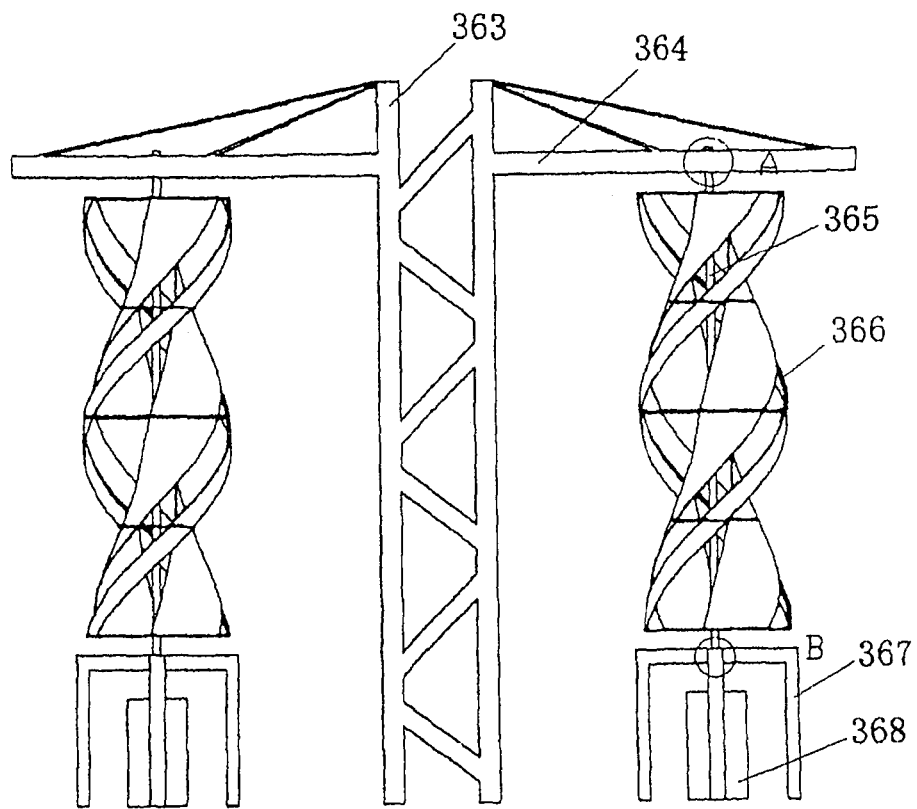

FIG. 43 is a structural diagram of a wind power generation system of the present invention with a horizontal array of helical wind rotors which are formed by combining drag type blade and lift type blade.

Figure 44:
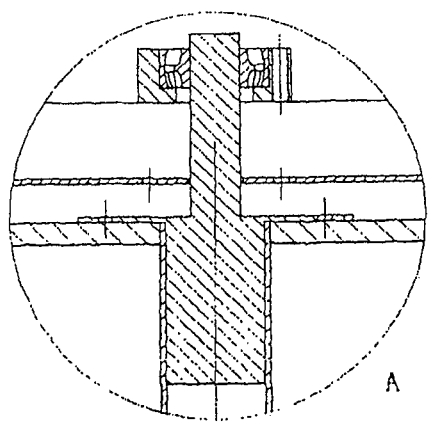

FIG. 44 is a diagram showing the fitting structure between the upper end of the rotation shaft of the wind rotor in the wind power generation system of FIG. 43 and the beam of a supporting frame.

Figure 45:
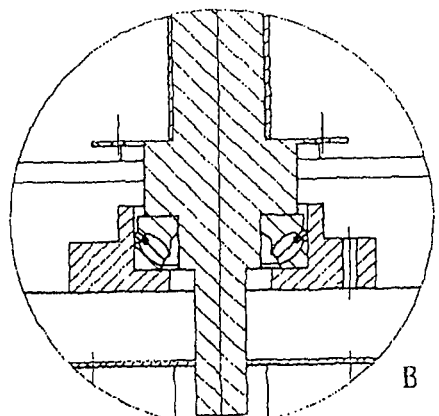

FIG. 45 is a diagram showing the fitting structure between the lower end of the rotation shaft of the wind rotor in the wind power generation system of FIG. 43 and a load-bearing base.

In the above figures, 101 is ground base, 102 is tower, 103 is mast, 104 is beam, 105 is wind rotor, 106 is generator set and transmission mechanism, 107 is locating bearing, 108 is multiple generator sets, 109 is transmission mechanism (a gear box with clutch), 110 is rotation shaft of a wind rotor, 111 is direct-drive generator set, 112 is coupler, 113 is rotation shaft of wind rotor, 114 is ground base, 115 is tower, 116 is mast, 117 is beam, 118 is wind rotor, 119 is generator set and transmission mechanism, 120 is locating bearing, 121 is ground base, 122 is tower, 123 is mast, 124 is beam, 125 is wind rotor, 126 is generator set and transmission mechanism, 127 is locating bearing, 128 is lift type blade, 129 is drag type blade, 201 is helical drag type blade, 202 is opening, 203 is helical lift type blade, 204 is partition board, 205 is internal-side member of helical drag type blade, 206 is middle member of helical drag type blade, 207 is external-side member of helical drag type blade, 208 is horizontally connection turn-over edge of helical drag type blade member, 209 is vertically connection turn-over edge of helical drag type blade member, 210 is connection turn-over edge of helical lift type blade, 211 is airfoil section of helical lift type blade, 212 is central member of partition board in a wind rotor with two groups of blades, 213 is partition board member I, 214 is partition board member II, 215 is partition board member III, 216 is partition board member IV, 217 is partition board between two groups of blades, 218 is helical lift type blade, 219 is connection turn-over edge of helical lift type blade, 220 is helical drag type blade, 221 is connection turn-over edge of helical drag type blade member, 222 is flange, 223 is lineal drag type blade, 224 is opening between drag type blade and lift type blade, 225 is lift type blade, 226 is partition board, 227 is connection turn-over edge of lineal drag type blade, 228 is connection turn-over edge of lineal lift type blade, 229 is airfoil section of lineal lift type blade, 230 is central member of partition board of a wind rotor with three groups of blades, 231 is partition board member I, 232 is partition board member II, 233 is partition board member III, 234 is partition board member IV, 235 is lineal drag type blade, 236 is opening between lineal drag type blade and lineal lift type blade, 237 is lineal lift type blade, 238 is partition board of three-group blades, 239 is helical lift type blade (external side), 240 is helical lift type blade (internal side), 241 is helical drag type blade, 242 is lineal lift type blade (external side), 243 is lineal lift type blade (internal side), 244 is rigid frame connecting lineal lift type blades, 245 is lineal drag type blade, 246 is partition board, 247 is central disk of partition board, 248 is radial spoke of partition board, 249 is reinforced rib of radial spoke, 250 is fixing back plate, 251 is rivet hole of partition board for connecting external-side lift type blade, 252 is rivet hole of partition board for connecting internal-side lift type blade and drag type blade, 253 is central disk of partition board, 254 is spoke of partition board, 255 is reinforced rib of spoke, 256 is fixing back plate on spoke, 257 is external-side lift type blade, 258 is internal-side lift type blade, 259 is drag type blade, 260 is rivet connecting lift type blade and fixing back plate, 261 is rigid connection frame between lift type blades, 262 is outermost helical lift type blade, 263 is intermediate helical lift type blade, 264 is innermost helical lift type blade, 265 is helical drag type blade, 266 is outermost lineal lift type blade, 267 is intermediate lineal lift type blade, 268 is innermost lineal lift type blade, 269 is rigid frame connecting lift type blade, 270 is lineal drag type blade, 271 is partition board, 272 is central disk of partition board, 273 is spoke of partition board, 274 is reinforced rib of spoke, 275 is fixing back plate of intermediate lift type blade on spoke, 276 is fixing back plate of external-side lift type blade on spoke, 277 is central disk of partition board, 278 is spoke of partition board, 279 is reinforced rib of spoke, 280 is fixing back plate of external-side lift type blade, 281 is fixing back plate of internal-side lift type blade, 282 is external-side lift type blade, 283 is intermediate lift type blade, 284 is internal-side lift type blade, 285 is drag type blade, 286 is rivet connecting lift type blade and fixing back plate, 287 is rigid connection frame between lift type blades, 301 is upper shaft pin of wind rotor, 302 is S-shaped piece on the upper end of wind rotor, 303 is central axis member of wind rotor, 304 is middle I member of wind rotor, 305 is middle II member of wind rotor, 306 is peripheral member of wind rotor, 307 is mandrel of wind rotor, 308 is S-shaped piece on the lower end of wind rotor, 309 is flange of lower shaft of wind rotor, 310 is lower shaft pin of wind rotor, 311 is through hole for central shaft member, 312 is upper turn-over edge of member, 313 is through hole of turn-over edge, 314 is lateral turn-over edge of central shaft member, 315 is upper turn-over edge of central shaft member, 316 is lateral turn-over edge of middle I member of wind rotor, 317 is upper turn-over edge of middle I member of wind rotor, 318 is turn-over edge of middle II member of wind rotor, 319 is upper turn-over edge of middle II member of wind rotor, 320 is lateral turn-over edge of peripheral member, 321 is upper turn-over edge of peripheral member, 322 is wind meter and dogvane, 323 is upper shaft pin of wind rotor, 324 is supporting frame, 325 is ring-shape gear, 326 is drive gear, 327 is generator set, 328 is magnetic levitation bearing means, 329 is central through hole of ring-shape gear, 330 is flange of ring-shape gear, 331 is limit screw, 332 is gasket, 333 is pin hole of drive gear, 334 is pin key of sliding piece, 335 is reset spring, 336 is excitation stator, 337 is sliding groove of sliding piece, 338 is sliding key of generator rotor shaft, 339 is lower shaft pin of helical wind rotor, 340 is housing, 341 is soft-ferromagnetic sleeve, 342 is permanent magnet, 343 is lubricating material, 344 is rolling ball, 345 is square hole for soft-ferromagnetic sleeve, 346 is limit screw, 247 is wind meter and dogvane, 348 is upper beam, 349 is generator set, 350 is drive gear, 351 is ring-shape gear, 352 is helical wind rotor, 353 is magnetic levitation bearing, 354, is lower beam, 355 is street lamp pole, 356 is wind meter and dogvane, 357 is supporting frame, 358 is helical wind rotor, 359 is ring-shape gear, 360 is generator set, 361 is foundation for supporting frame, 362 is securing wire cable for supporting frame.

DETAILED DESCRIPTION OF EMBODIMENT

Below, some embodiments of the present invention are described with reference to the drawings.

Embodiment 1

Figure 1:
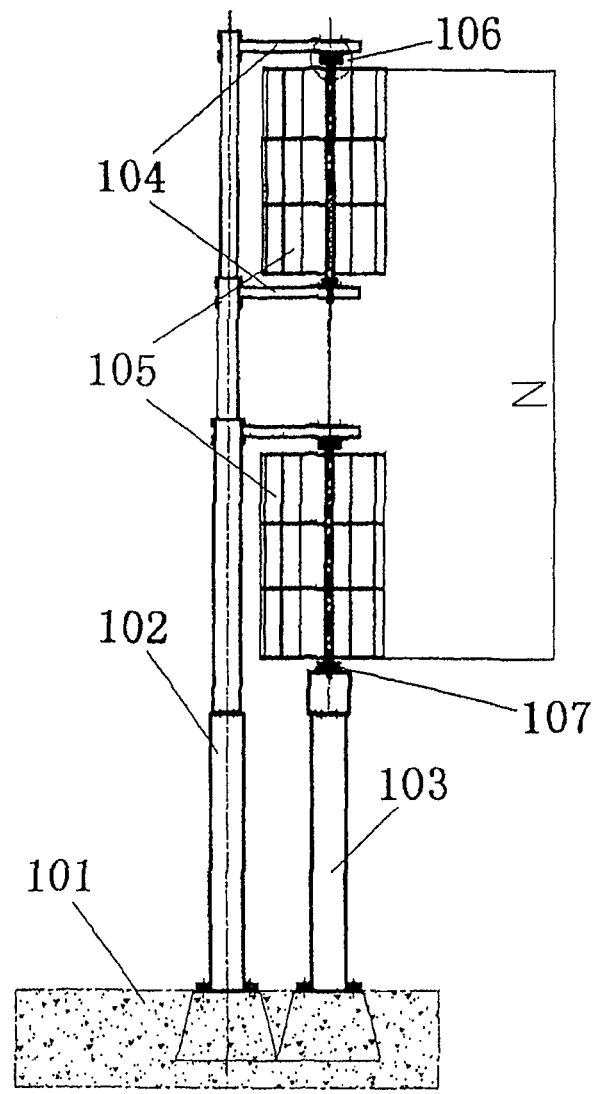
Figure 2:
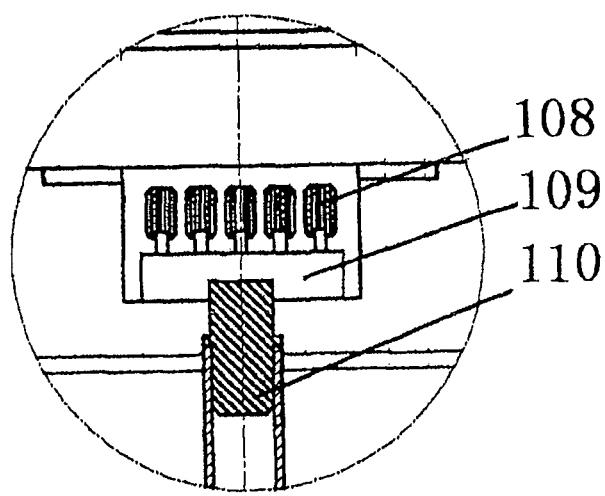
FIG. 2 is a structural diagram of the wind rotor combined with multiple generator sets in a wind power generation system of the present invention formed by a column of power generation units.
Figure 3:
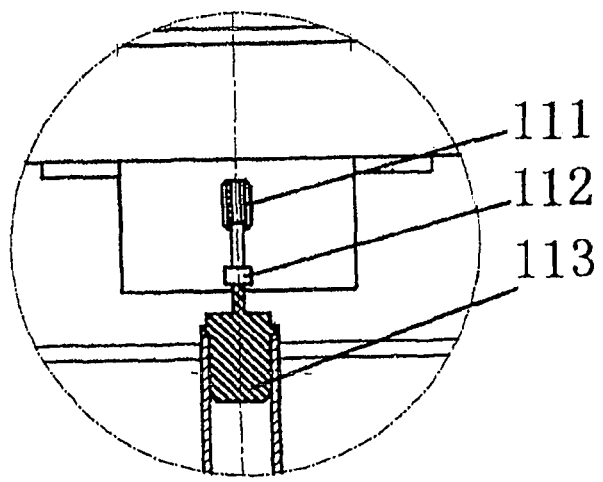
FIG. 3 is a structural diagram of the wind rotor combined with single generator set in a wind power generation system of the present invention formed by a column of power generation units.

This embodiment represents a wind power generation system formed by single-column generator unit lying on one side. In particular, one of its preferred array structures is shown in FIG. 1. The tower 102 and the mast 103 are both securely fastened to the ground through a ground base 101. The beam 104 is positioned at different heights of the tower 102. The wind rotor 105 may be a combination of drag type blade and lift type blade. Individual wind rotor is located between adjacent upper and lower beams. While the lower end of the rotation shaft of the wind rotor is coupled with the locating bearing 107 arranged on the lower beam. As shown in FIG. 2, the upper end of each rotation shaft 110 of the wind rotor can be connected with five 10 KW generator sets via a drive gear box 109. The number of the generator units can be increased according to the requirement of the wind field design. All the electricity produced by every power generation unit is transmitted together to power storage equipment. Furthermore, in the drive gear box can also be provided a clutch which is controlled by signals from wind meter and dogvane of the system so as to automatically control the states of the clutch in the drive gear box according to the wind speed condition and thereby adjusting the number of the generator sets activated in each power generation unit during the starting and normal running of the wind rotor. Also based on the wind field condition, the upper ends of the wind rotor's rotation shafts 113 of each power generation unit may be only connected with one 50 KW direct-drive generator 111 through a coupler 112, as shown in FIG. 3.

Embodiment 2

Embodiment 2 represents a wind power generation system formed by two columns of power generation units lying on both side. In particular, one of its preferred array structures is shown in FIG. 4. The connection manner and operation procedure of the wind rotor and the generator set are same as that of Embodiment 1.

Embodiment 3

Embodiment 3 represents a wind power generation system formed by three columns of power generation units with one column on the top and two columns on the bottom when viewed from the top view. In particular, one of its preferred array forms is shown in FIG. 5. The connection method and operation procedure of the wind rotor and the generator set are same as that of Embodiment 1.

Embodiment 4

Embodiment 4 exemplarily discloses a combined helical wind rotor of drag type blade and lift type blade. Said helical wind rotor is a helical wind rotor with two groups of blades. Its structure is shown in FIG. 6: the drag type blades 201 and lift type blades 203 are separated by the partition board 204 into six layers which create six wind channels arranged from top to bottom. There is an opening 202 between the drag type blades 201 and the lift type blades 203, which opening also forms a wind channel. Individual drag type blade is assembled by mutually splicing of the internal-side member 205, the middle member 206 and the external-side member 207 by means of the horizontally continuous turn-over edges 208, as shown in FIG. 7. The upper and lower turn-over edge 209 of the drag type blade and the upper and lower turn-over edge 210 of lift type blade may be respectively connected with the partition board above or underneath it through rivets, as shown in FIG. 7 and FIG. 8. The partition board also can be formed by splicing nine members, as shown in FIG. 9. A through hole is arranged on the central member 212 of the partition board, both sides of which central member is symmetrically provided with partition board member (I) 213, partition board member (II) 214, partition board member (III)

215, and partition board member (IV) 216 in turn. All these partition board members can be connected either by riveting their turn-over edges or by staggered overlap of the adjacent two members.

FIG. 10 is an assembly diagram showing the structure at one level of the wind rotor in the present embodiment. The drag type blade 220 and the lift type blade 218 may be riveted to the upper and lower partition board by the aid of the upper and lower turn-over edge 209 and 219. The drag type blade and the lift type blade in one group of wind rotors have their outward convexity located in the same round helicoid. The horizontal angle α corresponding to the drag type blade may be 80 degrees; the horizontal angle β corresponding to the opening between the drag type blade and the lift type blade may be 40 degrees; and the horizontal angle γ corresponding to the lift type blade may be 40 degrees, as shown in FIG. 10. Each layer of partition board can be fixed with the flange 222 by riveting while the flange can be linked with the rotation shaft by a keyway. When the height of the wind rotor is relatively high, the rotation shaft can be divided into several sections from top to bottom. The upper and lower rotation shafts are firstly positioned by the bearing and then are connected by a coupler, thereby ensuring the concentricity of the upper and lower rotation shafts. When the drag type blade and lift type blade experience moment of force produced by wind, the moment of force is in turn transmitted through the partition board and the flange to the rotation shaft, and finally the rotation shaft drives the generator to generate electricity.

Embodiment 5

Embodiment 5 represents a lineal wind rotor with three groups of blades. One of its preferred structures is shown in FIG. 11. The partition board 226 separates the lineal drag type blade 223 and the lineal lift type blade 225 into several layers. There is an opening 224, which also forms a wind channel, between the drag type blade and lift type blade. The partition board may be formed by splicing thirteen members. The central member 230 of the partition board is provided with a through hole. The three sides of the triangular central member 230 in turn splice the partition board member (I) 231, the partition board member (II) 232, the partition board member (III) 233 and the partition board member (IV) 234 symmetrically. The upper and lower turn-over edges of the lineal drag type blade 235 and lineal lift type blade 237 are riveted with the upper and lower partition board 238, as shown in FIG. 15. The horizontal angle α corresponding to the drag type blade 235 may be 80 degrees; the horizontal angle β corresponding to the opening 236 between the drag type blade and the lift type blade may be 40 degrees; and the horizontal angle γ corresponding to the lift type blade 237 may be 40 degrees. Each layer of partition board can be fixed with the flange 222 by riveting while the flange can be linked with the rotation shaft by a keyway. When the height of the wind rotor is relatively large, the rotation shaft can be divided into several sections from top to bottom. The upper and lower rotation shafts can firstly be positioned by the bearing and then are connected by a coupler, thereby ensuring the concentricity of the upper and lower rotation shafts. When the drag type blade and lift type blade experience moment of force produced by wind, the moment of force is in turn transmitted through the partition board and the flange to the rotation shaft, and finally the rotation shaft drives the generator to generate electricity.

Embodiment 6

Embodiment 6 exemplarily represents a wind rotor constructed by a drag type blade and a double lift type blade. One of the preferred shapes of the helical wind rotor with double lift type blade is shown in FIG. 16, and the lineal double lift type wind rotor is shown in FIG. 17. There are two methods for fixing the blades. One of the methods is shown in FIG. 17, i.e. the drag type blade 245 and the innermost-side lift type blade 243 are riveted to the partition board 246 while a metal frame 244 is adopted to connect the lift type blade 243 and the outermost-side lift type blade 242. The other method uses the partition board shown in FIG. 18. The center of the partition board is a disk 247, at the circumference of which is provided symmetrically several radial spokes 248 which is provided with reinforced ribs 249 and fixing back plate 250. The assembly of the blades and the partition board is shown in FIG. 19. The drag type blades and the innermost-side lift type blade are secured to the central disk of the partition board while the other lift type blades are fixed to the radial spokes. The spokes are provided with reinforced ribs 249 so as to increase the strength of the whole partition board and with fixing back plates 250. Notches are cut out at the upper and lower ends of the lift type blades. When the lift type blades are mounted, the reinforced ribs of the spokes are inserted into the notches, and the lift type blades are fixedly connected with the fixing back plate 250 by screws or rivets 260. A metal frame 261 can be added between the lift type blades to further increase the strength of the whole wind rotor.

Embodiment 7

Embodiment 7 exemplarily represents a wind rotor constructed by a drag type blade and a triple lift type blade. One of the preferred shapes of the helical wind rotor with triple lift type blade is shown in FIG. 21. There are two methods for fixing the blades, one of which is shown in FIG. 21. In the first method, the drag type blade 270 and the innermost lift type blade 268 are riveted to the partition board 271 and a metal frame 269 can be used to realize the connection between the innermost lift type blade 268, the intermediate lift type blade 267 and the outermost lift type blade 266. The second method adopts a partition board shown in FIG. 22. The center of said partition board is a disk 272, the circumference of which is symmetrically provided with several radial spokes 273 which are provided with reinforced ribs 274 and fixing back plates 275, 276. The assembly of the blades and the partition board is shown in FIG. 23. The drag type blades 285 and the innermost lift type blade 284 are secured to the central disk 277 of the partition board while, the intermediate lift type blades 283 and the outermost lift type blade 282 are fixed to the radial spokes. The spokes are provided with reinforced ribs 279 so as to increase the strength of the whole partition board and may be provided with fixing back plates 281, 280. Notches are cut out at the upper and lower ends of the lift type blades. When the lift type blades are mounted, the reinforced ribs 279 of the spokes are inserted into the notches. A fixed connection between the intermediate lift type blades 283 and the fixing back plate 181, and between the outermost lift type blade 282 and the fixing back plate 280 can be achieved by screws or rivets 286. A metal frame 287 can be added in between the lift type blades to further increase the strength of the whole wind rotor.

Embodiment 8

Embodiment 8 exemplarily represents a pure drag type helical wind rotor and a wind power generation system constructed by such a helical wind rotor. The preferred wind power generation system disclosed in this embodiment consists of the following components: a helical wind rotor, a transmission mechanism, multiple generator sets, a magnetic levitation bearing, a wind meter and dogvane, power storage equipment and a control device.

The helical wind rotor has a structure as shown in FIGS. 24, 25, 26, 27, 28, 29, 30, 31, and 32. This helical wind rotor may be composed of an upper shaft pin 301 of the wind rotor, an upper S-shaped piece of the wind rotor, a middle shaft member 303, a middle I member 304, a middle II member 305, a periphery member 306, a mandrel of the wind rotor 307, a lower S-shaped piece of the wind rotor and a lower shaft pin 309 of the wind rotor. The middle shaft member 303 is located at a middle shaft position, while the middle I member 304, the middle II member 305 and the peripheral member 306 are radially symmetrically disposed on both sides of the middle shaft member. FIGS. 29, 30, 31, and 32 respectively show the three-view diagrams of the middle shaft member 303, the middle I member 304, middle II member 305 and peripheral member 306. In Figures, the size and shape of each member are correlated and determined by the following parameters, i.e. axial height h of each piece of members, arc radius R1, R2, R3, R4, R5 of each member and angles θ1, θ2, θ3 between each two arcs. By adjusting the above parameters can be obtained members with different shapes, which members can be further combined to helical wind rotor with different shapes. In the Figures, each member can be provided with turn-over edges (314, 315, 316, 317, 318, 319, 320, and 321) with through holes. A layer of vertical member in said helical wind rotor is formed by riveting the left-side turn-over edge of one member with the right-side turn-over edge of another member (as shown in FIG. 26). Eight layers of same vertical members can be secured to an integer by riveting the upper turn-over edge of a lower layer vertical member in two adjacent layers of vertical members with a lower turn-over edge of an upper layer one. Each middle shaft member can ensure to be concentric with one hollow axle 307 passing through it. The upper S-shaped piece 302 is riveted to the upper edge of the vertical member on the top of helical wind rotor. The upper shaft pin 301 of the wind rotor is fixed to the upper S-shaped piece and the lower S-shaped piece 308 is riveted to the lower edge of the vertical member on the bottom of the helical wind rotor. The lower shaft pin 310 is fixed to the lower S-shaped piece. The upper end of the hollow axle 307 muff-couples with the upper shaft pin 301 of the wind rotor, and the lower end of the hollow axle 307 muff-couples with the lower shaft pin 310 of the wind rotor. The upper shaft pin 301 of the wind rotor is rotatably connected with the upper portion of the supporting frame. The lower shaft pin 310 of the wind rotor is fixedly connected with the flange 330 on the ring-shape gear 325 of the transmission mechanism through a flange 309. At the same time, the lower shaft pin 310 of the wind rotor is connected with the magnetic levitation bearing 328 (seen in FIG. 40). The magnetic levitation bearing 328 and five generator sets 327 are all fixed to the supporting frame 324. The five generator sets 327 with clutch all are provided at the external circumference of the ring-shape gear 325. The drive gear 326 on the upper end of the generator set is engaged with the teeth on the external circumference of the ring-shape gear 325. For the same reason, the drive gear of the five generator sets with clutch can also be engaged with the internal circumference teeth of the ring-shape gear. The output power supply line of each generator set is connected with the power storage equipment in parallel. The wind meter and dogvane 322 collects the electric signals from wind speed and transmits the electric signals to the control device which drives and controls the clutch of respective generator set.

The present embodiment utilizes the technical solution that one helical wind rotor drives multiple small power generator sets and the multiple small power generator sets can also be engaged with helical wind rotor at right time via a clutch according to the requirement of the wind speed. When the wind rotor starts at low wind speed, the number of the generator sets linked with the wind rotor can be reduced by a control device so as to lower the starting resistance of the wind rotor. The control device processes the real-time signal of the wind speed from the wind meter and dogvane and sends those signals to the computer in the control device to analyze and calculate. As a result, a driving signal is produced to control the clutch of the generator set. The clutch may be composed of a drive gear with a pin hole, a reset spring 335, a sliding piece 334, an excitation stator 336 and etc. The rotor shaft of the generator set is provided with a sliding key 338 and the sliding piece is provided with a sliding groove 337. The sliding piece muff-couples externally on the rotor shaft of the generator set. The sliding key 338 on the rotor shaft cooperates with the sliding groove 337 of the sliding piece such that the sliding piece and the rotor shaft always rotate synchronously and the sliding piece can move along the rotor shaft axially. When the driving signal is transmitted to the excitation stator 336 in the clutch, the excitation stator 336 produces magnetic force by attraction of which the sliding piece 334 displaces to overcome the tension of the reset spring 335 and be disengaged from the synchronal connection with the drive gear 326. When the driving signal is released, the excitation stator 336 loses magnetic force. Consequently, the sliding piece 326 moves towards the drive gear under the effect of tension produced by the reset spring 335 and then the pin key 334 of the sliding piece is inserted into the pin hole 333 of the drive gear. As a result, the drive gear 326 rotates with the rotor shaft 337 of the generator synchronously.

The structure of the magnetic levitation bearing adopted by the present embodiment is shown in FIG. 40. Said magnetic levitation bearing may include permanent magnets 342, a soft-ferromagnetic sleeve 341, rolling balls 344, lubricating material 343 and a housing 340. The permanent magnets 342 are disposed in the soft-ferromagnetic sleeve 341 with the same poles of the two permanent magnets opposed, and several rolling balls 344 are evenly located in between the soft-ferromagnetic sleeve 341, and lubricating material 343 is filled between the soft-ferromagnetic sleeve 341 and the housing 340 as well as between the two magnets 342 and the soft-ferromagnetic sleeve 341. The lower shaft pin 310 of the helical wind rotor is inserted into the square central hole 345 of the upper soft-ferromagnetic sleeve 341 and fixed thereto through screws 346. The weight of the helical wind rotor and the ring-shape gear acts on the upper soft-ferromagnetic sleeve inside the magnetic levitation bearing through the lower shaft pin of the wind rotor. Under the mutual effects of the permanent magnet's magnetic force and the rolling balls, the upper soft-ferromagnetic sleeve and upper permanent magnet portion inside the magnetic levitation bearing can rotate stably and the friction therebetween is very small, thereby decreasing the requirement to the wind speed when the wind rotor starts and simultaneously improving the wind energy conversion efficiency to electricity.

Since the helical wind rotor of the present embodiment is constructed by assembling standard members, a wind power rotor with enormous volume can be transported to the working site in separate parts and finished assembling at the site. This greatly decreases the difficulties in transportation and assembly. In addition, since the wind rotor members are standardized and individual member has relatively small size suitable for injection molding production, helical wind rotors with different height-radius ratio can be assembled according to the needs. For example, the helical wind rotor in the present embodiment is formed by eight layers of members but can also be added with another eight layers of members such that the height-radius ratio of said helical wind rotor is doubled. Another example is like following: each layer of members in the present embodiment is constructed by seven members totally, which are symmetric about the middle shaft members and thus only four pairs of moulds are needed to satisfy the assembly of the whole helical wind rotor. In this way, the diameter of the assembled helical wind rotor can be increased to be two times of the width of member produced by mould each time a pair of moulds is added. The above characteristics of the wind rotor make it possible to an easier series manufacture of the helical wind rotor products and to lower the production cost greatly.

Embodiment 9

The structure of Embodiment 9 is shown in FIG. 41.

The present embodiment exemplarily reveals a wind power generation device with small-size helical wind rotor. Said device can be used for street illumination. Said device is fixed to the street lamp pole 355 by the upper beam 348 and lower beam 354. The ring-shape gear 351, the drive gear 350 and three generator sets 349 of said device are all arranged right above the helical wind rotor. The drive gear 350 is fixed to the rotor shaft of the generator.

Since the helical wind rotor of the present embodiment has a relatively small size, it can be assembled by one middle shaft member, two middle members and two peripheral members. In this way, only three moulds are needed to realize this helical wind rotor. If the diameter of the wind rotor is further reduced, the helical wind rotor can be modeled in section along the axial direction. In this way, only one pair of moulds is needed to realize the helical wind rotor.

The helical wind rotor is rotated by wind and three generator sets rotate with the wind rotor to generate electricity. The produced electricity is transmitted to batteries and then is inverted to supply power to the street lights.

Embodiment 10

Embodiment 10 exemplarily represents a small-size independent wind power generation device with helical wind rotor. Said device has a structure as shown in FIG. 42. In the present embodiment, the foundation 361 of the supporting frame is fastened by securing wire cables for the supporting frame. The helical wind rotor 358 is fixed to the ring-shape gear 359 with which the rotor shafts of three generator sets 360 are engaged via a drive gear. The manufacture method of the helical wind rotor in the present embodiment is same as that of Embodiment 8. The present embodiment is rather suitable to install at the wind gaps of high and steep mountain.

Embodiment 11

Embodiment 11 is a preferred embodiment of a wind power system constructed by horizontally arraying wind power generation units with helical wind rotor formed by a combination of drag type blade and lift type blade.

The structure of the present embodiment is shown in FIG. 43. The mast 363 of the wind rotor is built on a firm base. The connection structure between the upper end of the rotation shaft of the helical wind rotor and the supporting beam 364 is shown in FIG. 44. Said connection structure suspends part of weight of the wind rotor 366 on the supporting beam. The connection structure between the lower end of the rotation shaft 365 of the helical wind rotor and the ground supporting frame 367 is shown in FIG. 45. A magnetic levitation bearing as shown in FIG. 40 can be added under said structure. By using this magnetic levitation bearing, the huge self-weight of the wind rotor is effectively overcome and the starting resistance of the wind rotor is lowered at the same time.

What is claimed is:

1. A wind power generation system, comprising:
a vertical axis wind rotor;
a transmission mechanism; and
generator sets and a supporting tower, wherein the vertical axis wind rotor is mounted on the supporting tower and coupled to the multiple generator sets via the transmission mechanism, wherein components of said wind rotor include a drag type blade, a lift type blade, a rotation shaft and a partition board, the drag type blade being provided at the center portion adjacent to the rotation shaft of said vertical axis wind rotor, the lift type blade being provided on the outer edge of said vertical axis wind rotor in which an opening is provided between the drag type blade and the lift type blade, several drag type blades and lift type blades being arranged symmetrically around the rotation shaft, and several partition boards divide the integral wind rotor in the axial direction of rotation shaft into several layers of wind rotor units, and wherein several lift type blades are additionally provided on the outer side of said lift type blades in the radial direction of the rotation shaft of the wind rotor in which openings are provided between the lift type blades, the drag type blades and all the lift type blades being arranged symmetrically around the rotation shaft of the wind rotor, and the drag type blades and the innermost lift type blades being secured to the partition board while a rigid frame connection is adopted between the lift type blades.

2. The wind power generation system according to claim 1, wherein a horizontal angle range corresponding to the drag type blade is from 60 degrees to 100 degrees, a horizontal angle range corresponding to the lift type blade is from 20 degrees to 60 degrees; and a horizontal angle range corresponding to the opening between the drag type blade and the lift type blade is from 20 degrees to 60 degrees.

3. The wind power generation system according to claim 1, wherein the drag type blade and lift type blade is composed of several members, the drag type blade members extending by splicing to each other in the horizontal direction, the drag type blade and the lift type blade being fixedly connected with the adjacent upper and lower partition boards in the vertical direction while each layer of partition board is fixedly connected with the rotation shaft, and wherein the circumferences of said drag type blade member and lift type blade member being provided with perforated turn-over edges through which joins between the members and between the members and the partition board are accomplished by rivets.

4. The wind power generation system according to claim 3, wherein the partition board is assembled by several components, the central portion of the partition board being fixedly connected with a flange through rivets while the flange is connected with the partition board by means of a pin key.

5. The wind power generation system according to claim 1, wherein the center of said partition board is a disk at a circumference of which is provided symmetrically with several radial spokes, and the spokes are provided with reinforced ribs in the radial direction and also with fixing back plates, and the reinforced ribs of the spokes are inserted into the notches of the lift type blades which are cut out at the upper and lower ends of the lift type blades, and the lift type blades are fixedly connected with the fixing back plates by screws or rivets.

6. The wind power generation system according to claim 1, wherein the drag type blade and lift type blade are spiral or lineal.

7. A wind power generation system, comprising:
a vertical axis wind rotor;
a transmission mechanism; and
generator sets and a supporting tower, wherein the vertical axis wind rotor is mounted on the supporting tower and coupled to the multiple generator sets via the transmission mechanism, wherein the vertical axis wind rotor is a combined helical wind rotor which is formed by splicing and combining several vertical members of the wind rotor along the axial direction of the helical wind rotor, the vertical members of the helical wind rotor being in turn formed by splicing and combining several horizontal members of the wind rotor along the radial direction of the helical wind rotor, and the transmission mechanism is connected with both the helical wind rotor and the rotor shafts of the multiple generator sets, wherein the horizontal member of the helical wind rotor comprises a middle shaft member, a middle member and a peripheral member, in which several middle members are positioned symmetrically on both sides of the middle shaft member and two peripheral vertical members are positioned on the outer side of the middle members, wherein the middle shaft member, middle member and peripheral member are provided at their circumferences with turn-over edges bending towards the direction of the concave curved surface of the members, on which turn-over edges are provided through holes at equal distance, and the turn-over edges of the adjacent members are abutted and riveted together, and wherein at the upper and lower ends of said helical wind rotor is respectively provided connectors which is composed of S-shaped pieces and shaft pins, the upper and lower shaft pins being fixed to the axial center of the upper and lower S-shaped pieces respectively while the upper and lower S-shaped pieces being fixed to the upper end and lower ends of the helical wind rotor respectively, the upper shaft pin being rotatably connected with the supporting frame and the lower shaft pin being connected with a magnetic levitation bearing means.

8. The wind power generation system according to claim 7, wherein the circumferences of said middle shaft member, middle member and peripheral member have shapes of rectangle or triangle or hexagon, the middle shaft member and the middle member, the middle member and the middle member, and the middle member and the peripheral member are spliced and combined with each other along the axial direction and radial direction into a helical wind rotor.

9. The wind power generation system according to claim 7, wherein the magnetic levitation bearing means includes a permanent magnet, a soft-ferromagnetic sleeve, rolling balls, lubricating material and a housing, and wherein the permanent magnets being disposed in the soft-ferromagnetic sleeve with the same poles of the two permanent magnets opposed and several rolling balls evenly located in between the soft-ferromagnetic sleeve, and lubricating material being filled between the soft-ferromagnetic sleeve and the housing as well as between the two permanent magnets and the soft-ferromagnetic sleeve.

10. The wind power generation system according to claim 7, wherein the transmission mechanism comprises a ring-shaped gear and a drive gear, in which the ring-shaped gear is fixedly connected with the vertical axis wind rotor, and wherein several drive gears are engaged with the ring-shaped gear in external meshing or internal meshing, furthermore several drive gears are coupled to the rotor shafts of several generator sets.

11. The wind power generation system according to claim 10, wherein between the drive gear and the rotor shaft of the generator set is provided a clutch which is formed of an excitation stator, a reset spring and a sliding piece, wherein the excitation stator, the reset spring and the sliding piece in turn muff-couple on the rotor shaft of the generator, the drive gear is loosely-fitted connected with the rotor shaft of the generator, the sliding piece is slidingly engaged with the generator rotor by a keyway, wherein under the action of the tension produced by the reset spring, a pin key of the sliding piece is inserted into a pin hole of the drive gear and the drive gear is synchronously rotated with the generator's rotor shaft; and wherein when the excitation stator produces magnetic force, the sliding piece is subjected to the attraction of the magnetic force so as to displace by overcoming the tension of the reset spring, such that the pin key of the sliding piece retreats from the pin hole of the drive gear and the rotor shaft of the generator is disengaged from the synchronized connection with the drive gear.

* * * * *